(12) United States Patent
Chaudhri

(10) Patent No.: US 8,525,839 B2
(45) Date of Patent: Sep. 3, 2013

(54) DEVICE, METHOD, AND GRAPHICAL USER INTERFACE FOR PROVIDING DIGITAL CONTENT PRODUCTS

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 485 days.

(21) Appl. No.: 12/788,278

(22) Filed: May 26, 2010

(65) Prior Publication Data

US 2011/0164042 A1 Jul. 7, 2011

Related U.S. Application Data

(60) Provisional application No. 61/292,841, filed on Jan. 6, 2010.

(51) Int. Cl.
*G06T 13/00* (2011.01)
*G06F 3/041* (2006.01)
*G06F 3/00* (2006.01)

(52) U.S. Cl.
USPC ............ 345/473; 345/173; 715/726; 715/732

(58) Field of Classification Search
USPC .................................. 345/473; 715/726, 732
See application file for complete search history.

(56) References Cited

U.S. PATENT DOCUMENTS

| | | | |
|---|---|---|---|
| 7,667,703 B2 * | 2/2010 | Hong et al. | 345/473 |
| 8,125,481 B2 * | 2/2012 | Gossweiler et al. | 345/419 |
| 8,185,842 B2 * | 5/2012 | Chang et al. | 715/776 |
| 2005/0151742 A1 * | 7/2005 | Hong et al. | 345/473 |
| 2009/0002335 A1 * | 1/2009 | Chaudhri | 345/173 |
| 2010/0302278 A1 | 12/2010 | Shaffer et al. | |

OTHER PUBLICATIONS

Apple, "Keynote '08 Users Guide," © 2008 Apple Inc., 204 pages, retrieved from: http://manuals.info.apple.com/en/Keynote08_UserGuide.pdf.*
Fluther, "When will they bring out flip around album art in itunes?" fluther.com, Jul. 22, 2008, http://www.fluther.com/18391/when-will-they-bring-out-flip-around-album-art-initunes/, 2 pages.
Wikipedia, "iTunes," Wikipedia, the free encyclopedia, updated Mar. 15, 2013, <http://en.wikipedia.org/wiki/ITunes>, 16 pages.
Wikipedia, "iTunes version history," Wikipedia, the free encyclopedia, updated Mar. 17, 2013, <http://en.wikipedia.org/wiki/ITunes_version_history>, 14 pages.

* cited by examiner

*Primary Examiner* — Tize Ma
(74) *Attorney, Agent, or Firm* — Morgan, Lewis & Bockius LLP

(57) ABSTRACT

A multifunction device having a touch-sensitive surface displays graphical objects that represent digital content products, each graphic object having a front side image and a back side image. An initial display shows front side images of objects representing digital content products. A user input selects a graphical object, resulting in an animation that simultaneously flips the graphical object over and enlarges it. At the end of the animation, the back side is displayed, and is larger than the initial front side image. A second user input on a front side image of a second graphical object results in a second animation that simultaneously flips the first graphical object over and reduces its size, and also flips the second graphical object over and enlarges it. The front side image of the first graphical object and the back side image of the second graphical object are thereby concurrently displayed.

18 Claims, 28 Drawing Sheets

DEVICE, METHOD, AND GRAPHICAL USER INTERFACE FOR PROVIDING DIGITAL CONTENT PRODUCTS

RELATED APPLICATIONS

This application claims priority to U.S. Provisional Application Ser. No. 61/292,841, filed Jan. 6, 2010, entitled "Device, Method, and Graphical User Interface for Providing Digital Content Products," which is incorporated herein by reference in its entirety.

This application is related to U.S. patent application Ser. No. 12/473,846, "Rotation Smoothing of a User Interface," filed May 28, 2009, which is incorporated by reference herein in its entirety.

TECHNICAL FIELD

This relates generally to electronic devices with touch-sensitive surfaces, including but not limited to electronic devices with touch-sensitive surfaces that display digital content products.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Existing methods for providing a user with digital media content (e.g., music, videos, audiobooks, and podcasts) are cumbersome, inefficient, and not intuitive. For example, finding a desired album and identifying the songs on the album are tedious and create a significant cognitive burden on a user. In addition, existing methods take longer than necessary, thereby wasting energy. This latter consideration is particularly important in battery-operated devices.

SUMMARY

Accordingly, there is a need for computing devices with faster, more efficient, and more intuitive methods and interfaces for providing a user with digital media content. Such methods and interfaces may complement or replace conventional methods for providing a user with digital media content. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes displaying graphical objects that represent digital content products. Each graphical object has a front side image of a respective digital content product and a back side image of the respective digital content product. The initial display of the graphical objects shows the front side images of a plurality of digital content products. The method also includes detecting a first user input, which comprises a contact on the touch-sensitive surface at a location that corresponds to a front side image of a first graphical object of the displayed graphical objects. In response to detecting the first user input, the method displays a first animation that simultaneously flips the first graphical object over and enlarges the first graphical object. At the end of the first animation, the back side image of the first graphical object is displayed, and the back side image as displayed is larger than the front side image of the first graphical object as initially displayed. The method also includes detecting a second user input, which comprises a contact on the touch-sensitive surface at a location that corresponds to a front side image of a second graphical object of the displayed graphical objects. In response to detecting the second user input, the method displays a second animation that simultaneously flips the first graphical object over and reduces the size of the first graphical object, and flips the second graphical object over and enlarges the second graphical object. At the end of the second animation, the front side image of the first graphical object and the back side of the second graphical object are concurrently displayed.

In accordance with some embodiments, a multifunction device includes a display, a touch-sensitive surface, one or more processors, memory, and one or more programs; the one or more programs are stored in the memory and configured to be executed by the one or more processors. The one or more programs include instructions for performing the operations of the method described above. In accordance with some embodiments, a graphical user interface on a multifunction device with a display, a touch-sensitive surface, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by a multifunction device with a display and a touch-sensitive surface, cause the device to perform the operations of the method described above. In accordance with some embodiments, a multifunction device includes: a display; a touch-sensitive surface; and means for performing the operations of the method described above. In accordance with some embodiments, an information processing apparatus, for use in a multifunction device with a display and a touch-sensitive surface, includes means for performing the operations of the method described above.

Thus, multifunction devices with displays and touch-sensitive surfaces are provided with faster, more efficient, and more intuitive methods and interfaces for providing a user with digital media content, thereby increasing the effectiveness, efficiency, and user satisfaction with such devices. Such methods and interfaces may complement or replace conventional methods for providing a user with digital media content.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
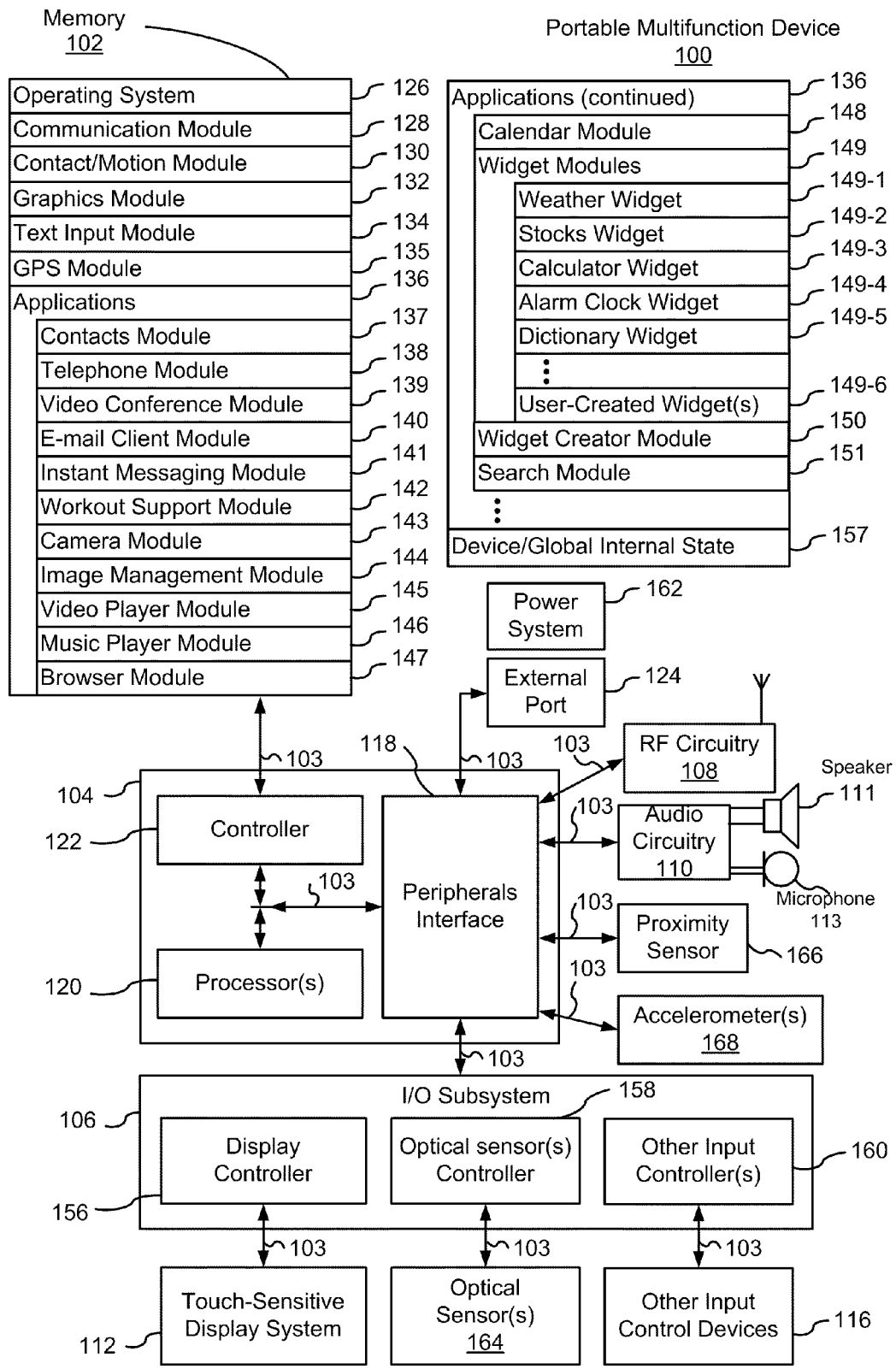
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. Nos. 11/459,606, "Keyboards For Portable Electronic Devices," filed Jul. 24, 2006, and 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
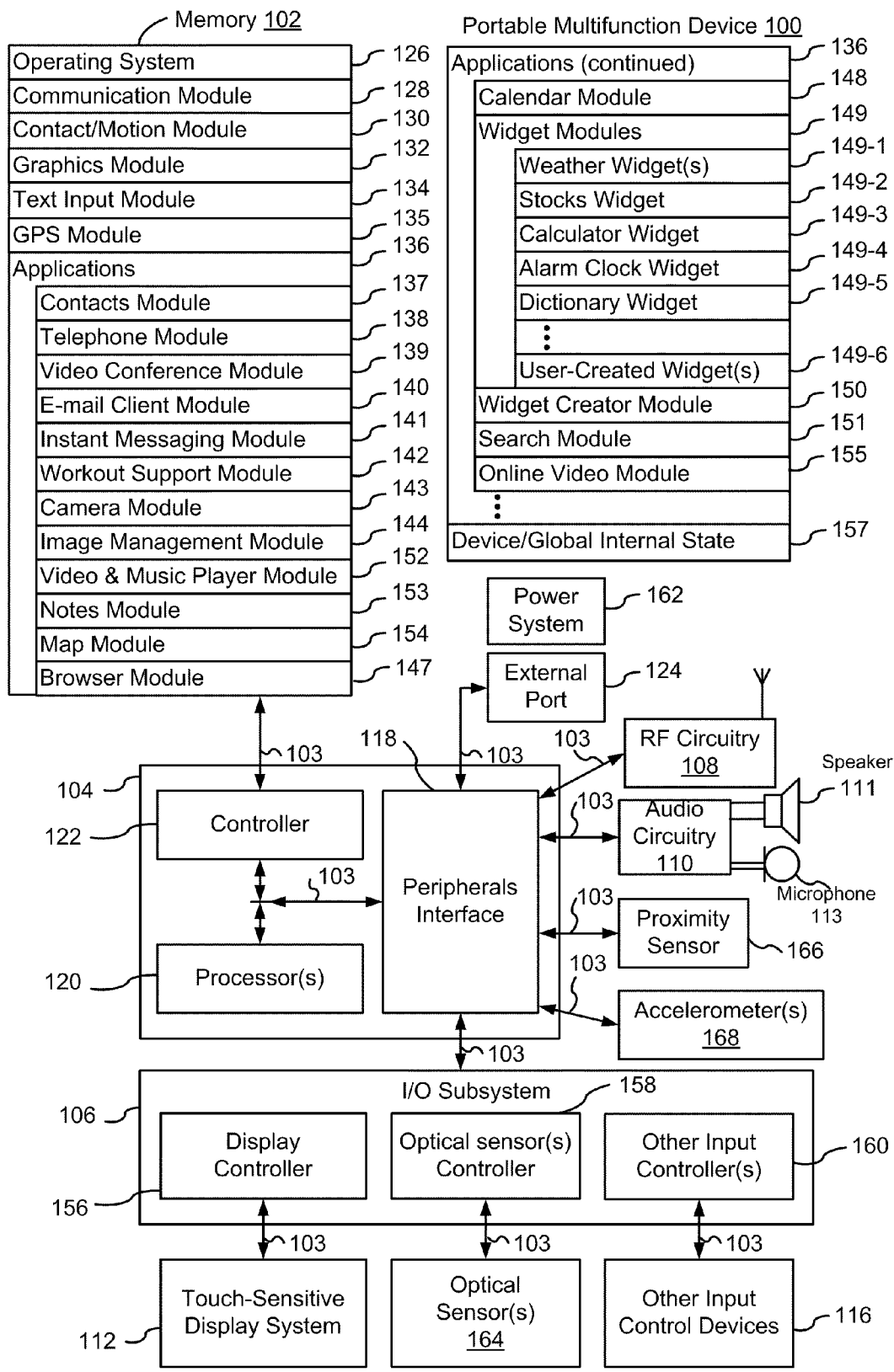

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
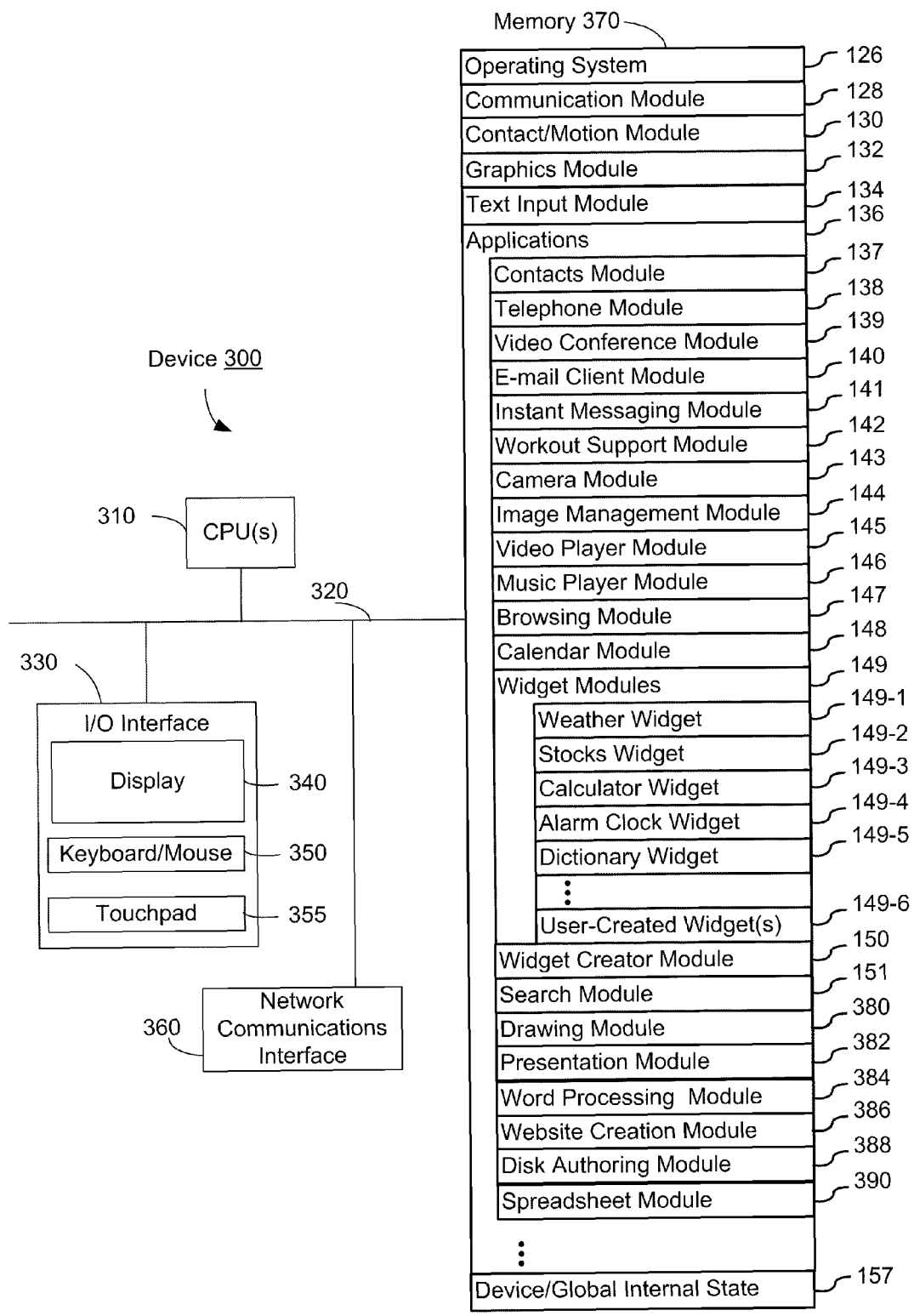
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file.

In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
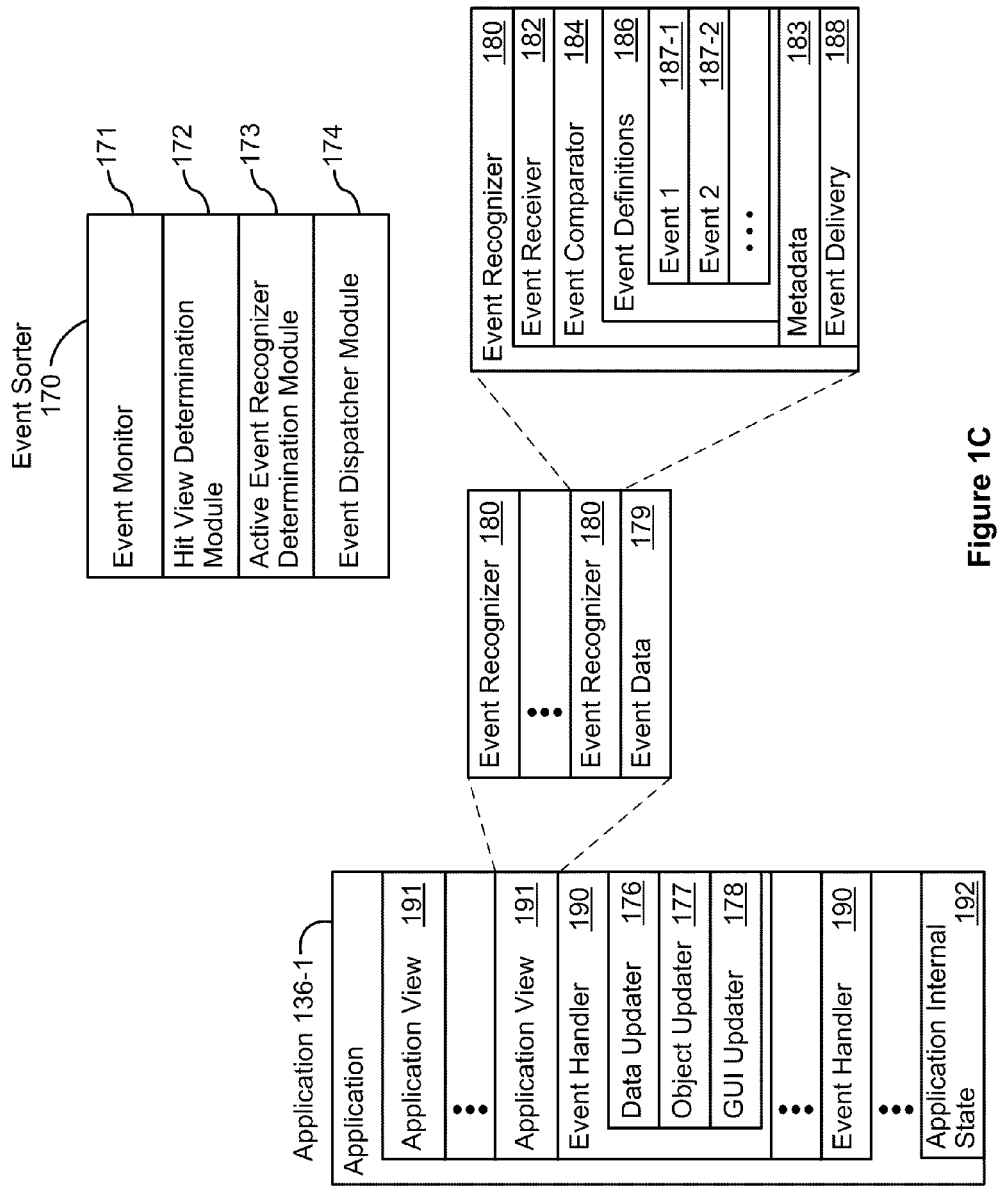
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input beyond a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes one or more application views 191, each of which includes instructions for handling touch events that occur within a respective view of the application's user interface. Each application view 191 of the application 136-1 includes one or more event recognizers 180 and one or more event handlers 190. Typically, a respective application view 191 includes a plurality of event recognizers 180 and a plurality of event handlers 190. In other embodiments, one or more of event recognizers 180 are part of a separate module, such as a user interface kit (not shown) or a higher level object from which application 136-1 inherits methods and other properties. In some embodiments, a respective application view 191 also includes one or more of: data updater 176, object updater 177, GUI updater 178, and/or event data 179 received from event sorter 170.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for the event's associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible or event cancel state, after which is disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 includes sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
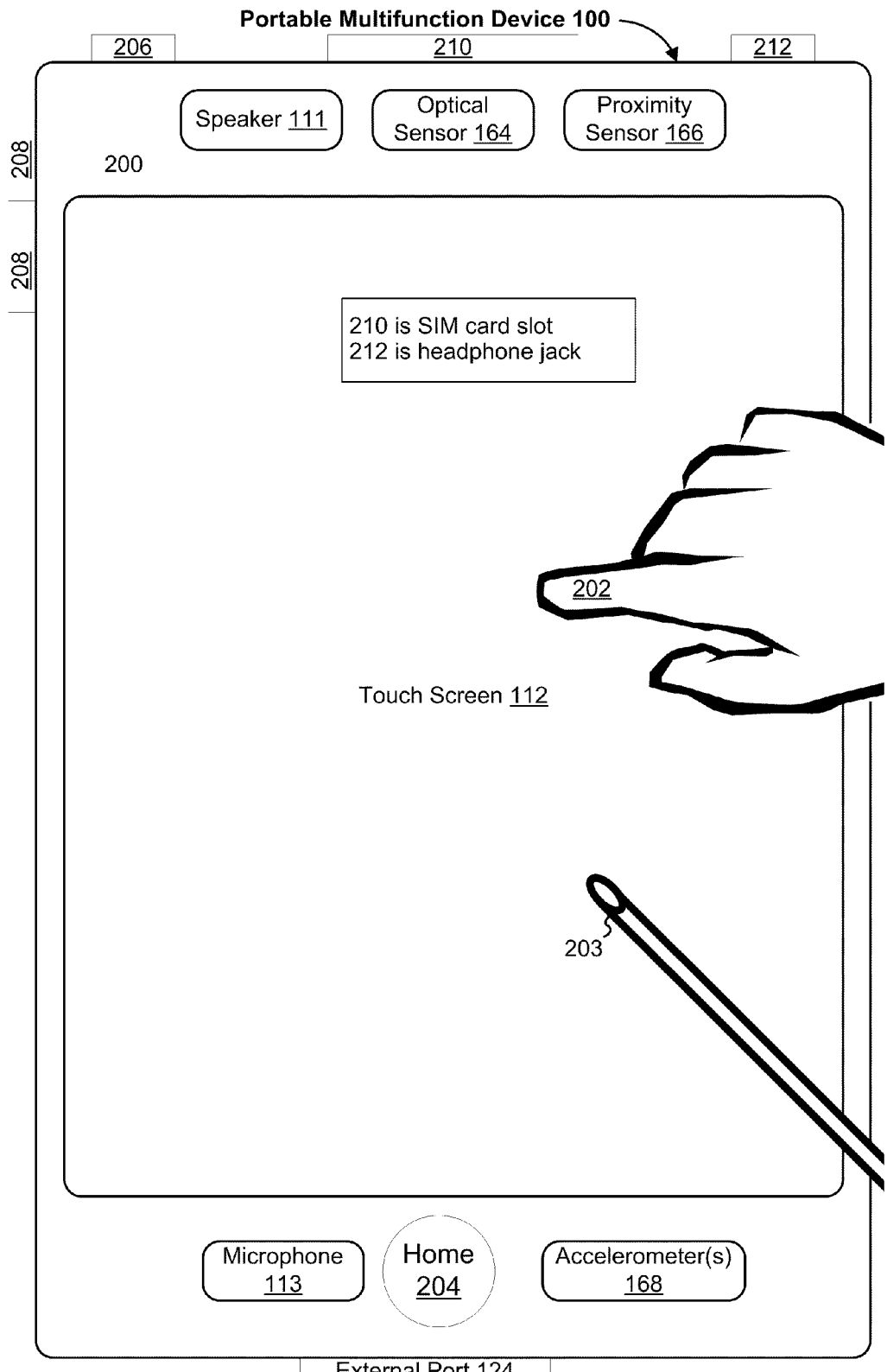
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
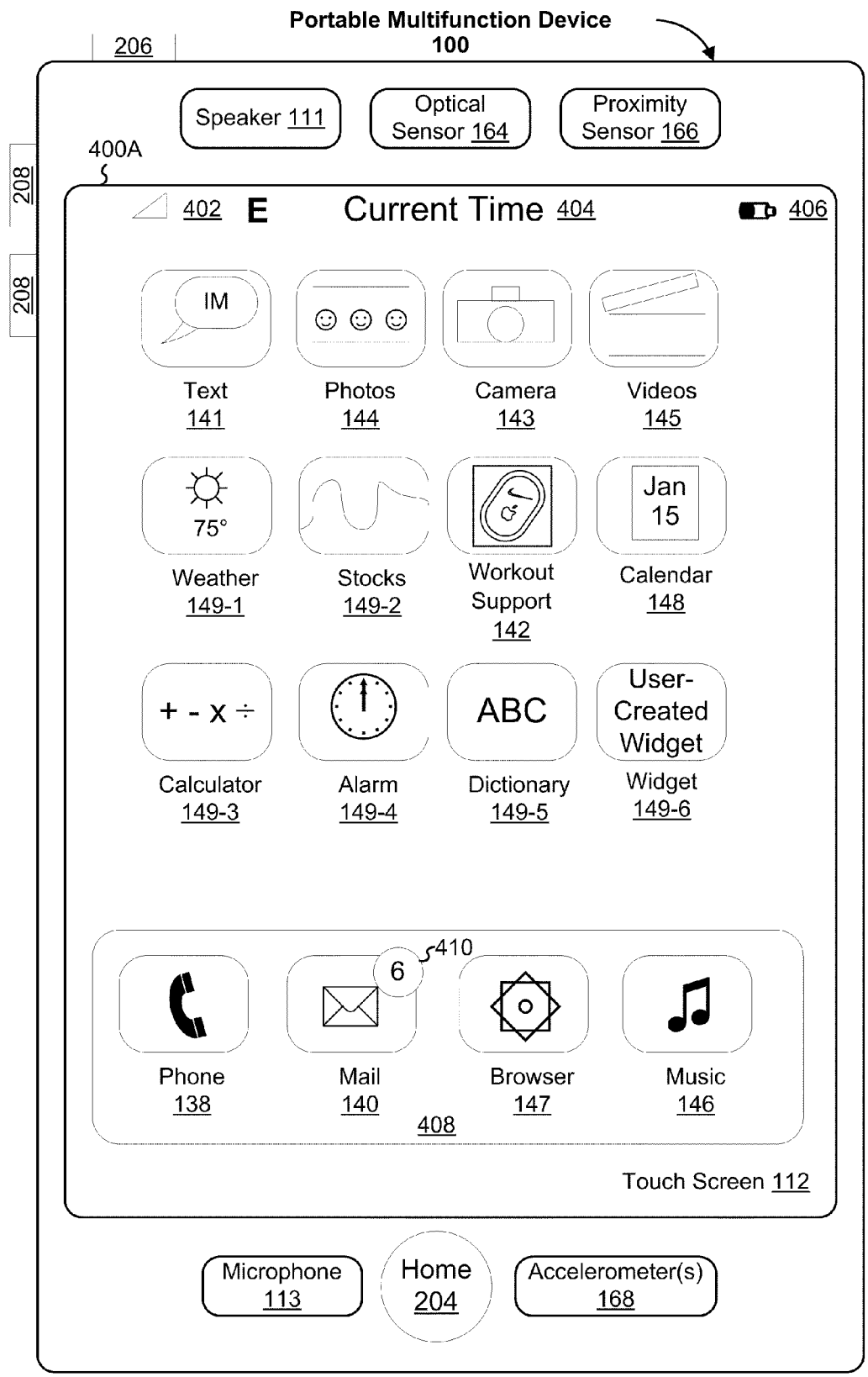
FIGS. 4A and 4B illustrate exemplary user interfaces for a menu of applications on a portable multifunction device in accordance with some embodiments.
Figure 4B:
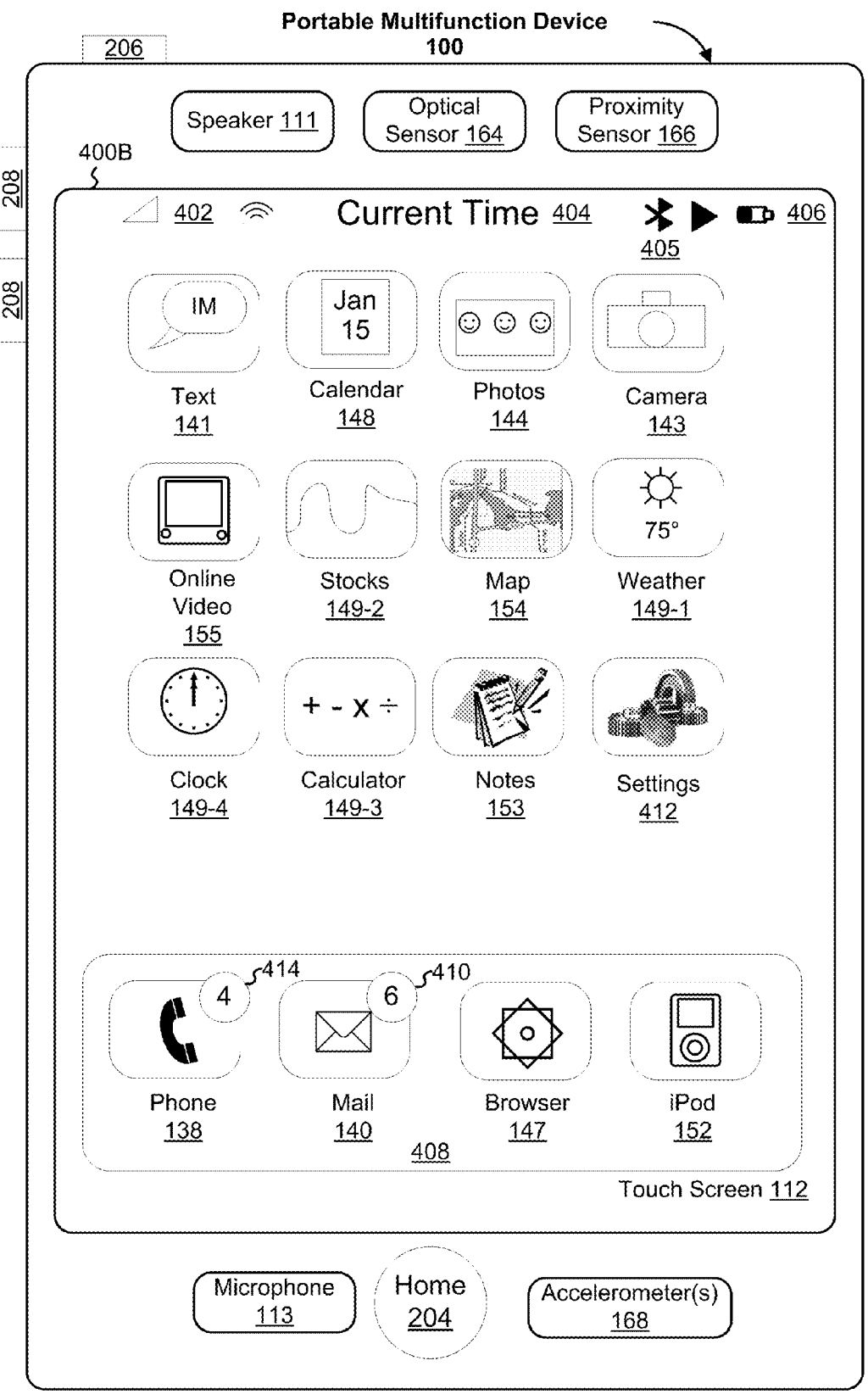

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.
In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for device 100 and its various applications 136, as described further below;

Video and music player module 152, also referred to as iPod (trademark of Apple Inc.) module 152; and Online video module 155, also referred to as YouTube (trademark of Google Inc.) module 155.

Figure 4C:
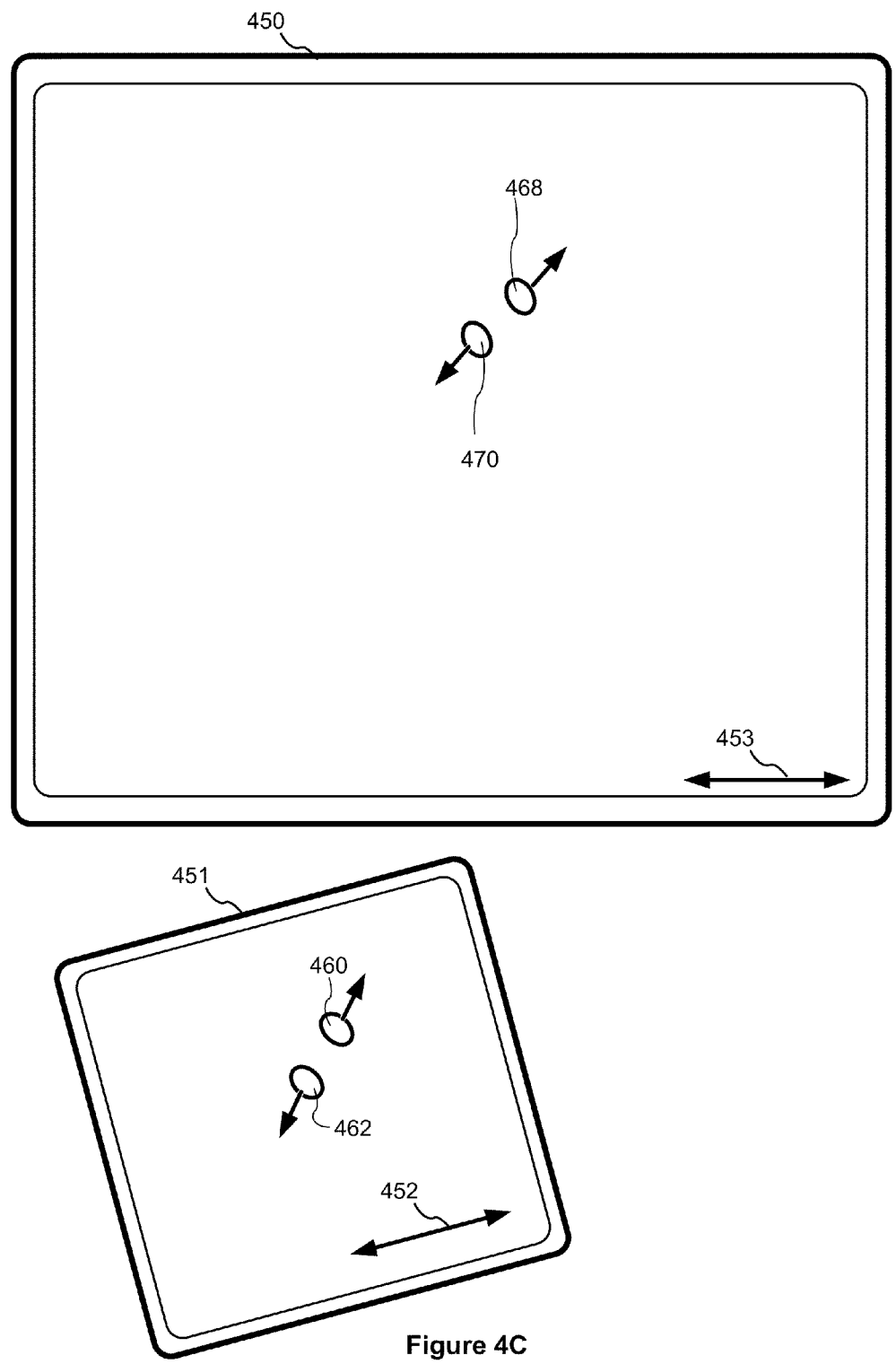
FIG. 4C illustrates an exemplary user interface for a multifunction device with a touch-sensitive surface that is separate from the display in accordance with some embodiments.

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

Figure 5A:
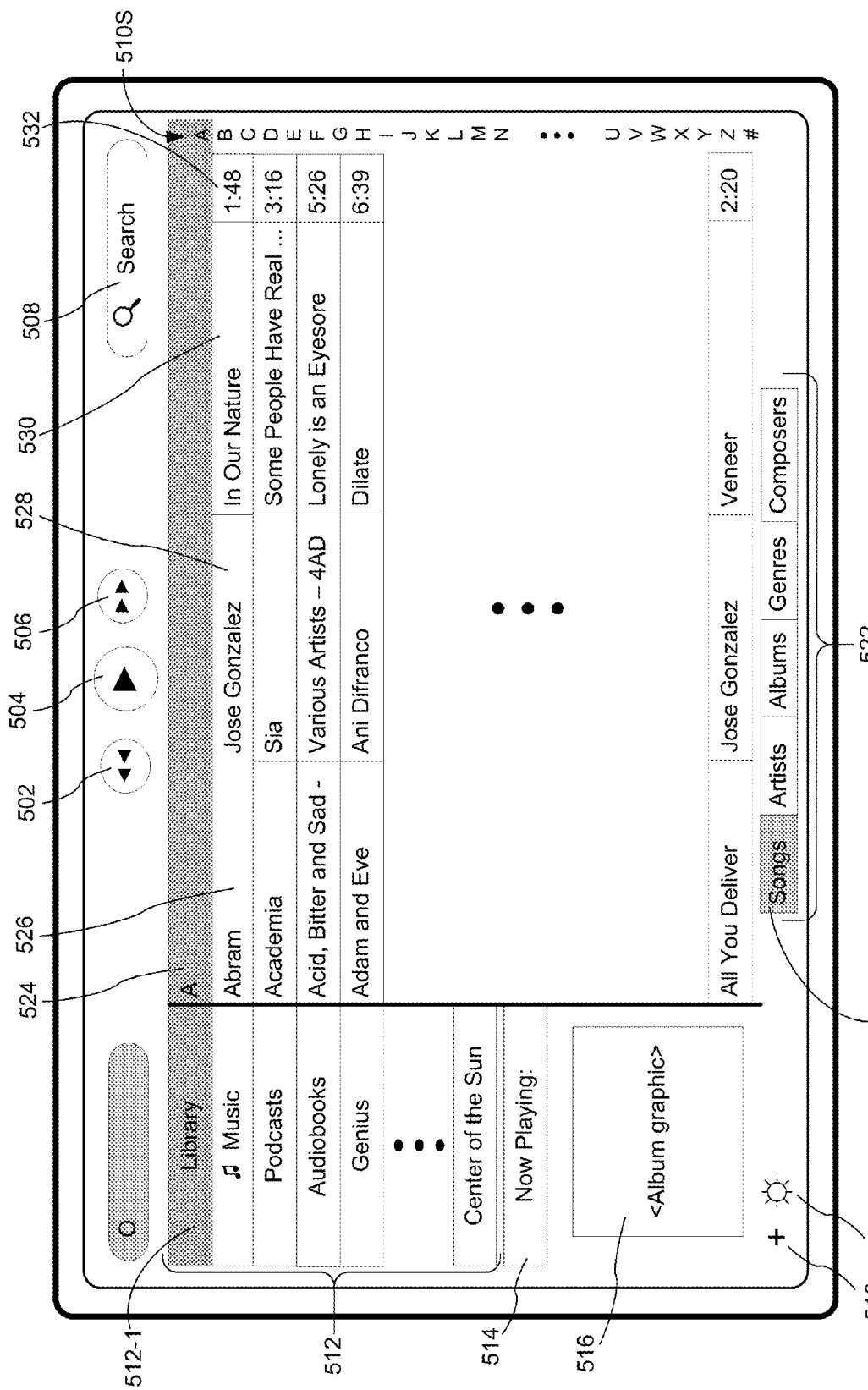
FIGS. 5A-5N and 5P-5R illustrate exemplary user interfaces for a digital content application in accordance with some embodiments.
Figure 5B:
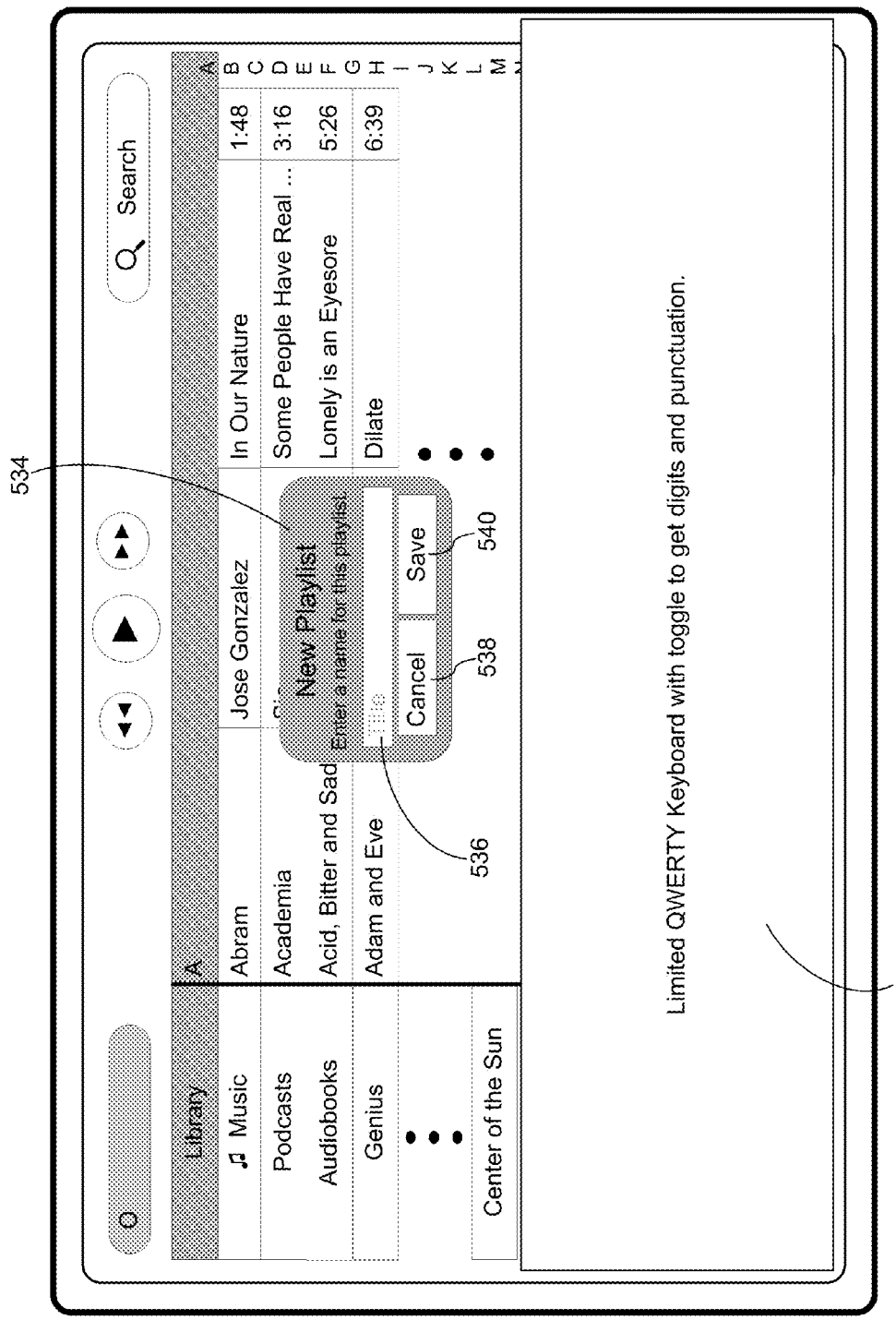
FIG. 5O illustrates schematically various stages in an animation for visually flipping over a digital content product in accordance with some embodiments.
Figure 5C:
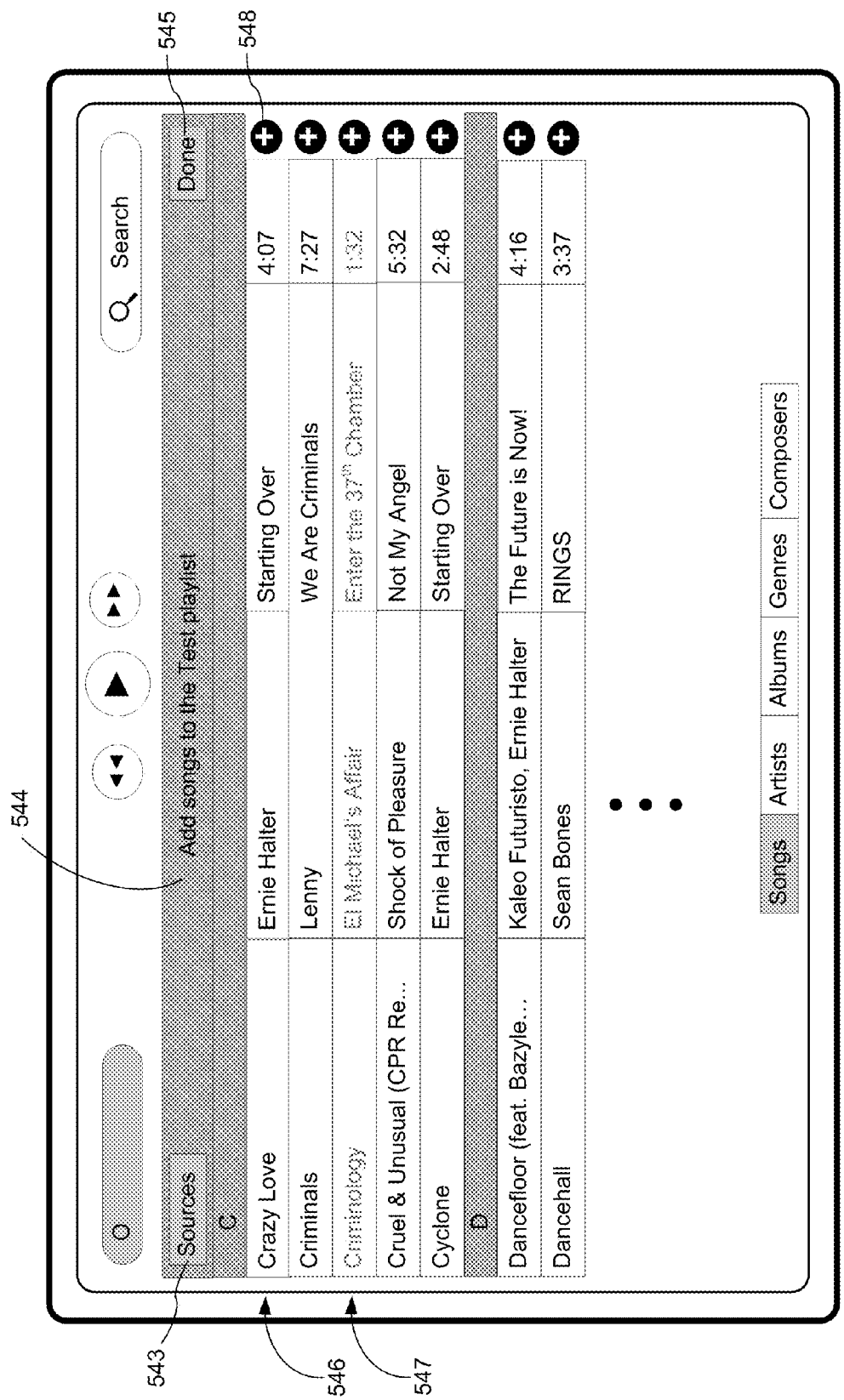
Figure 5D:
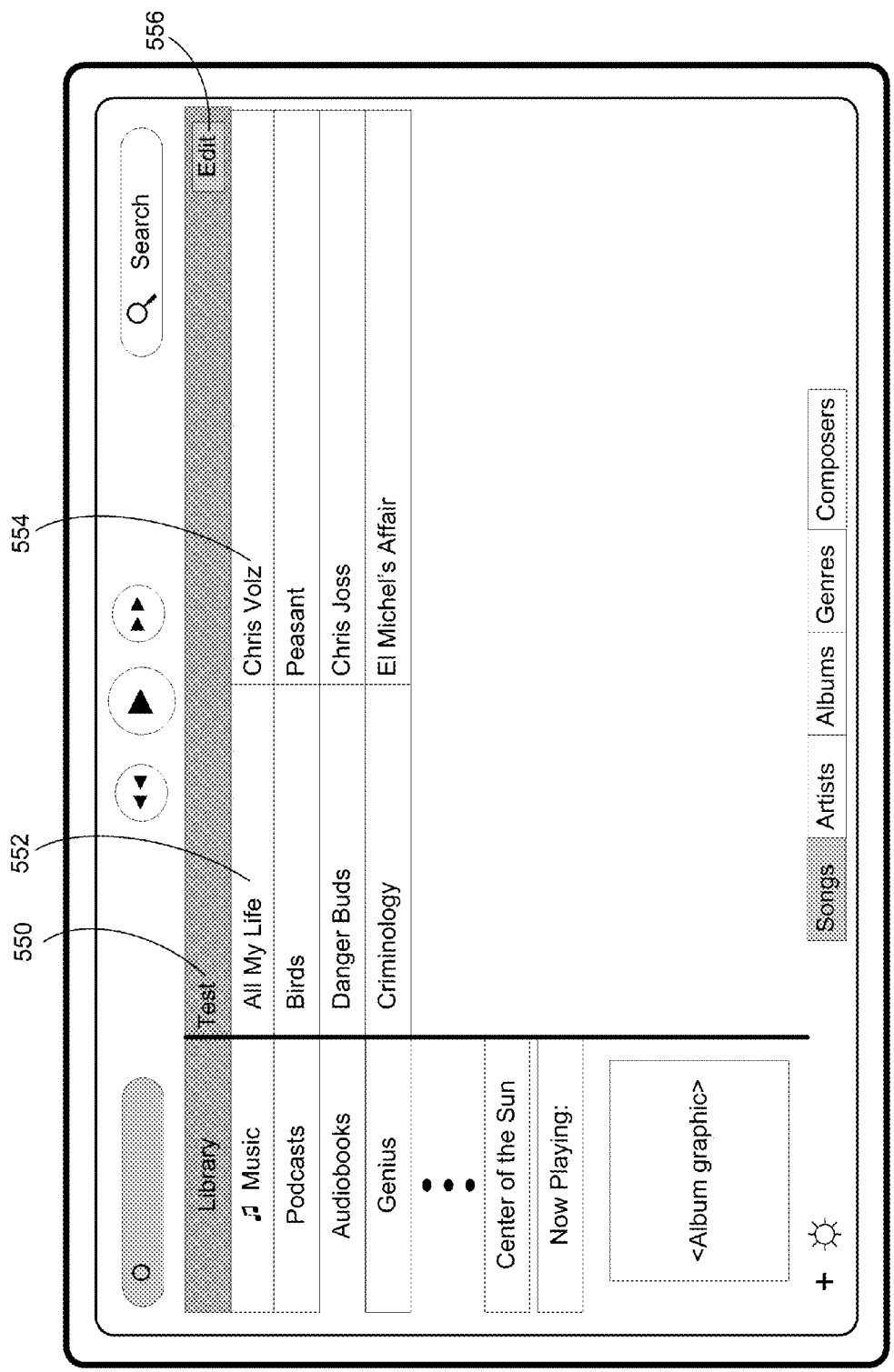
Figure 5E:
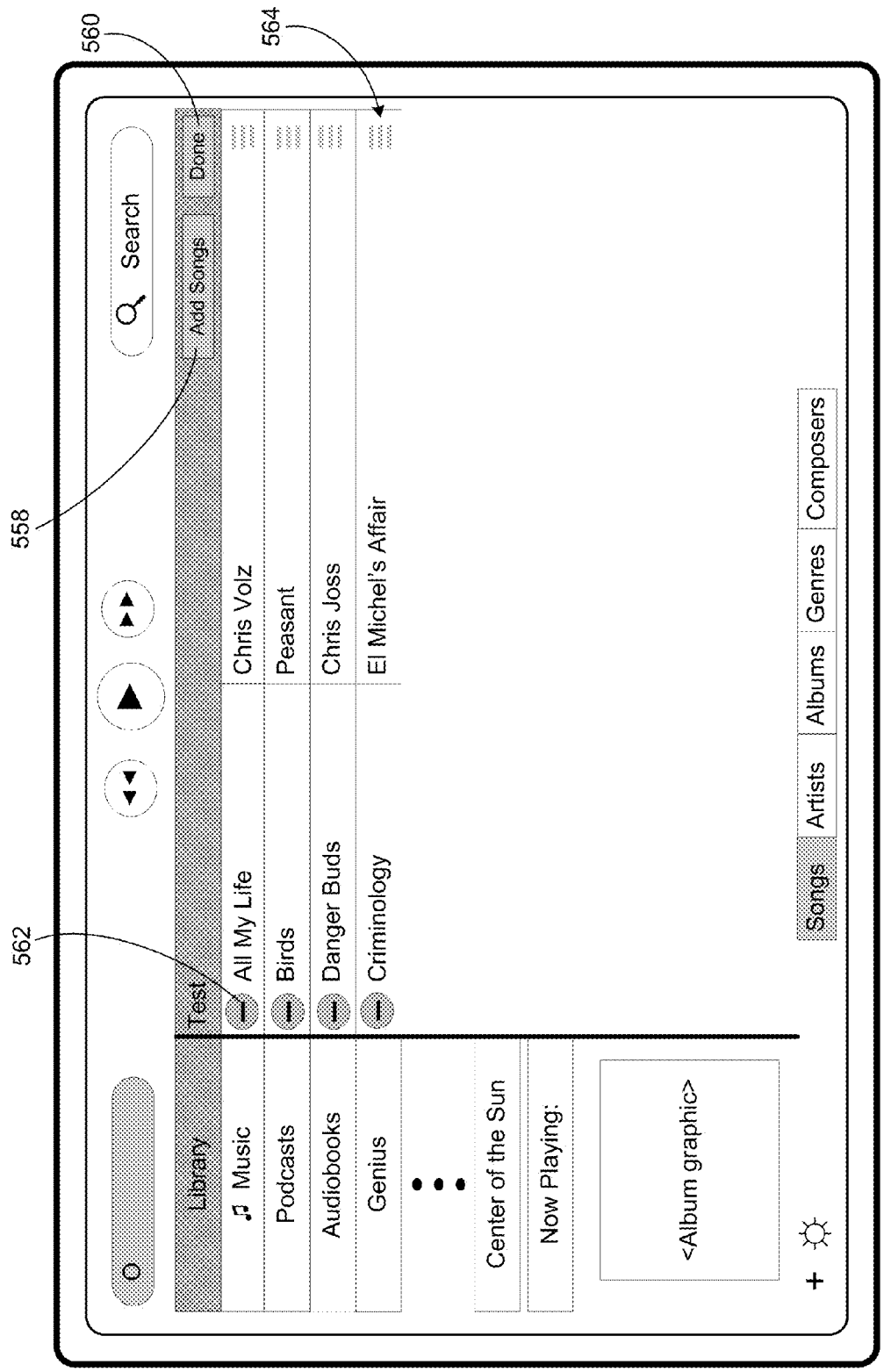
Figure 5F:
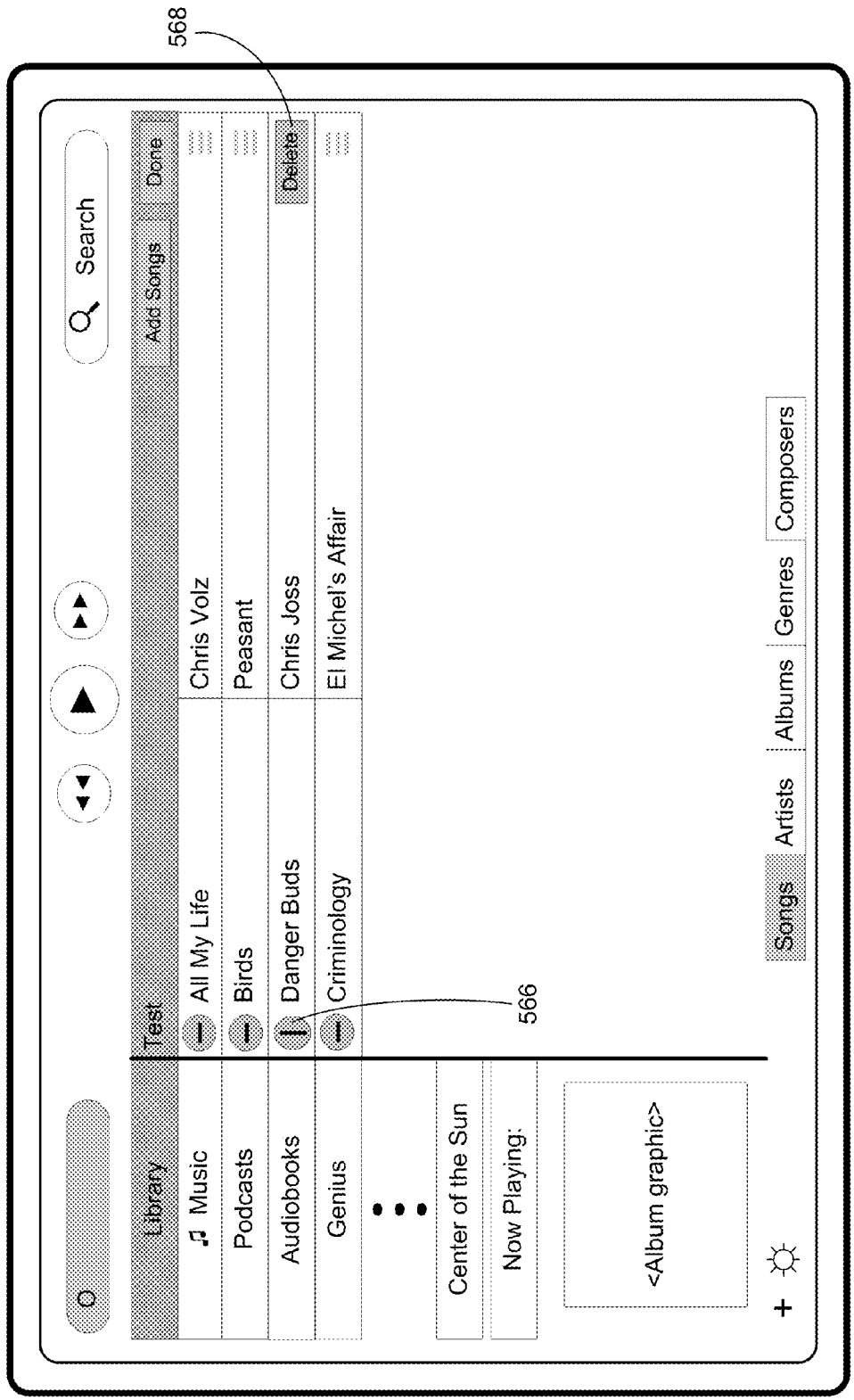
Figure 5G:
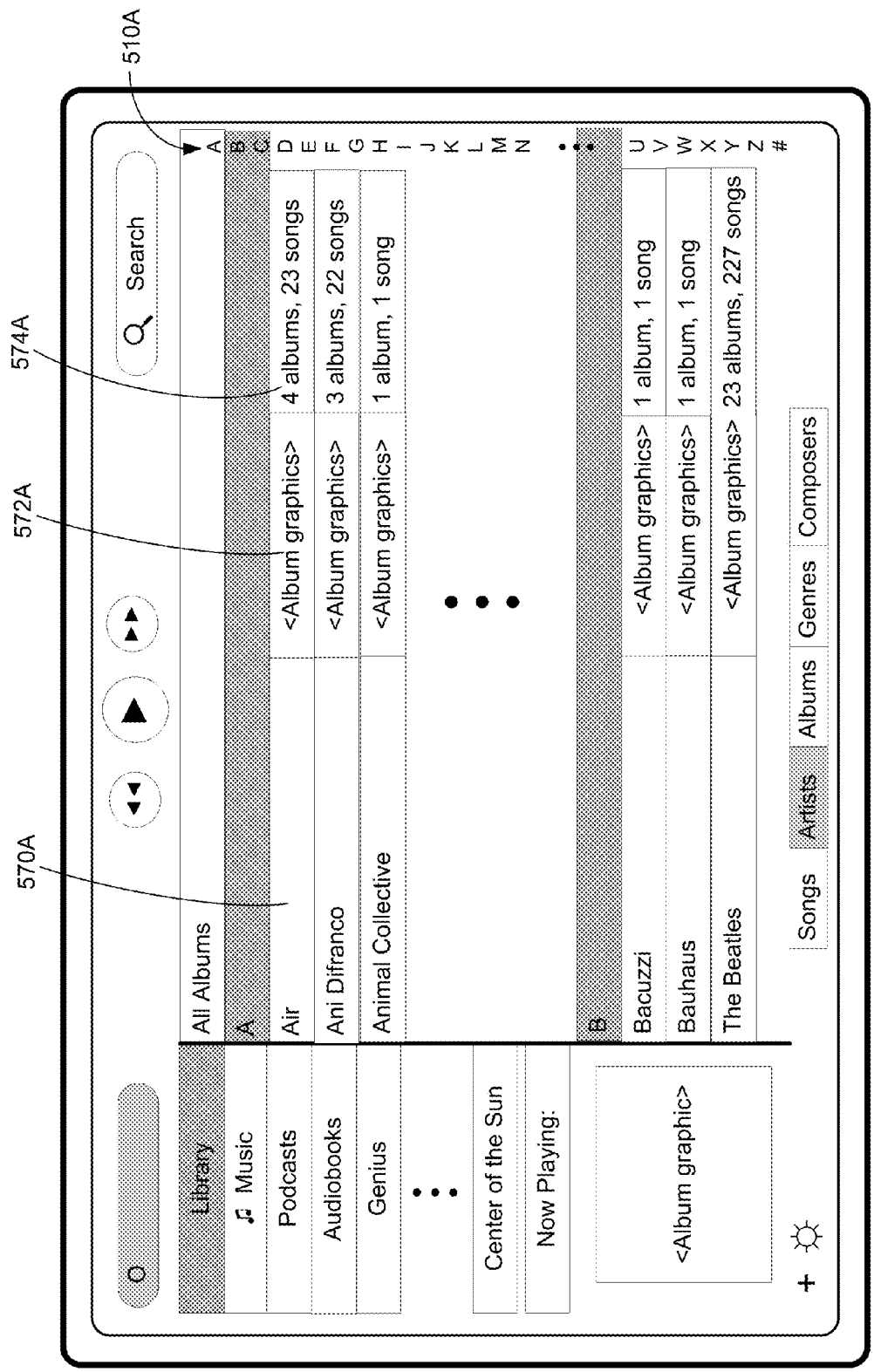
Figure 5H:
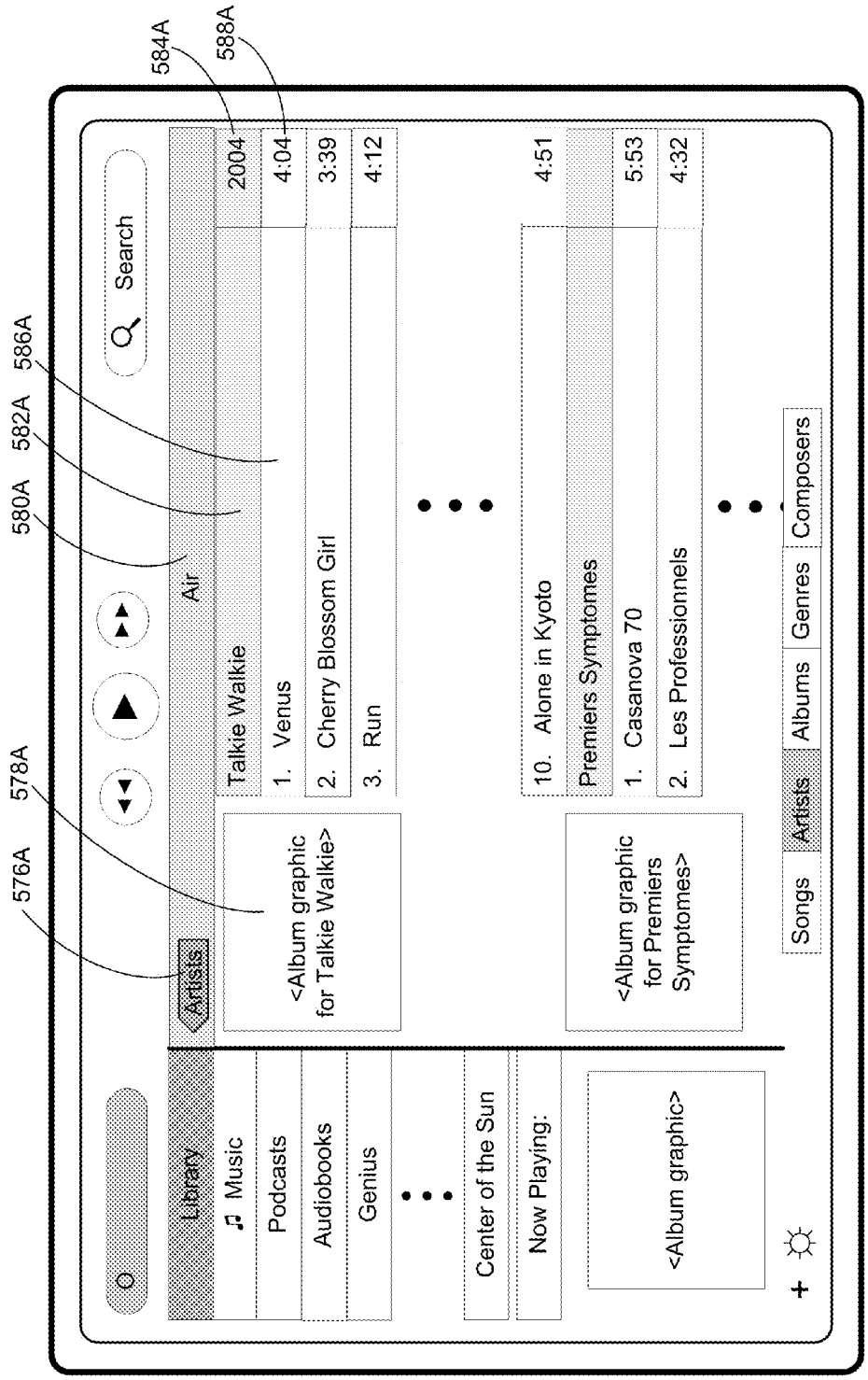
Figure 5I:
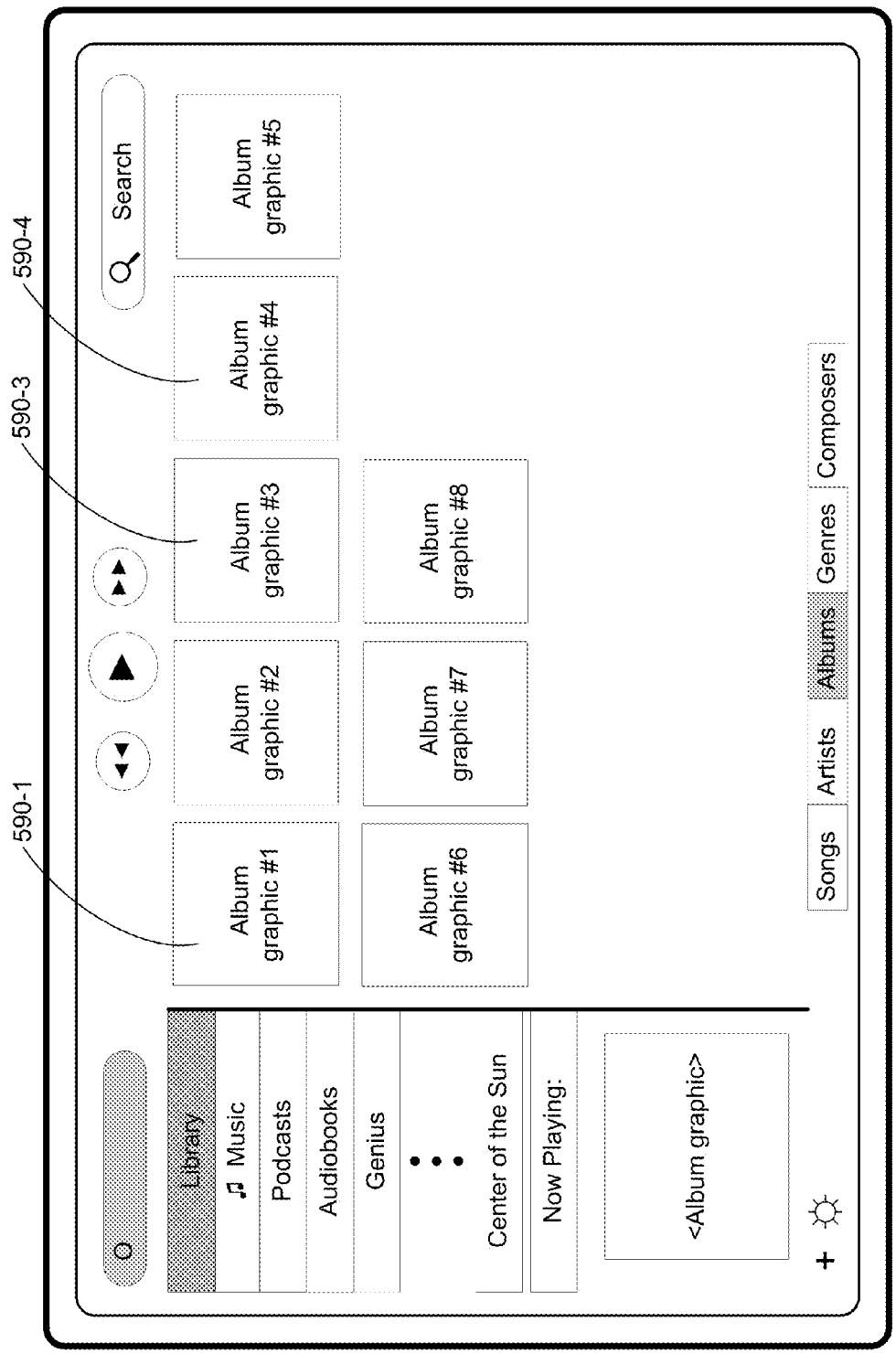
Figure 5J:
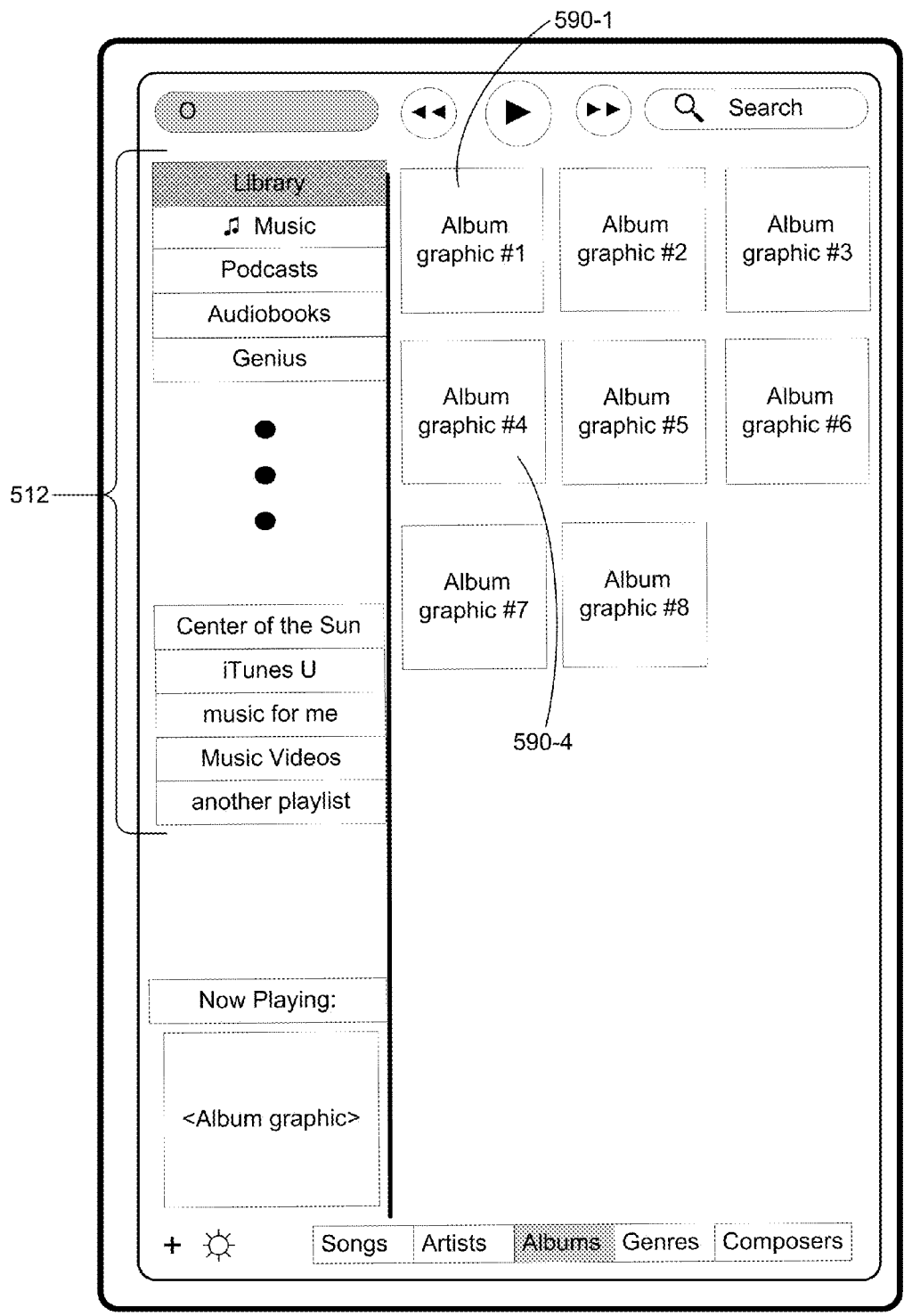
Figure 5K:
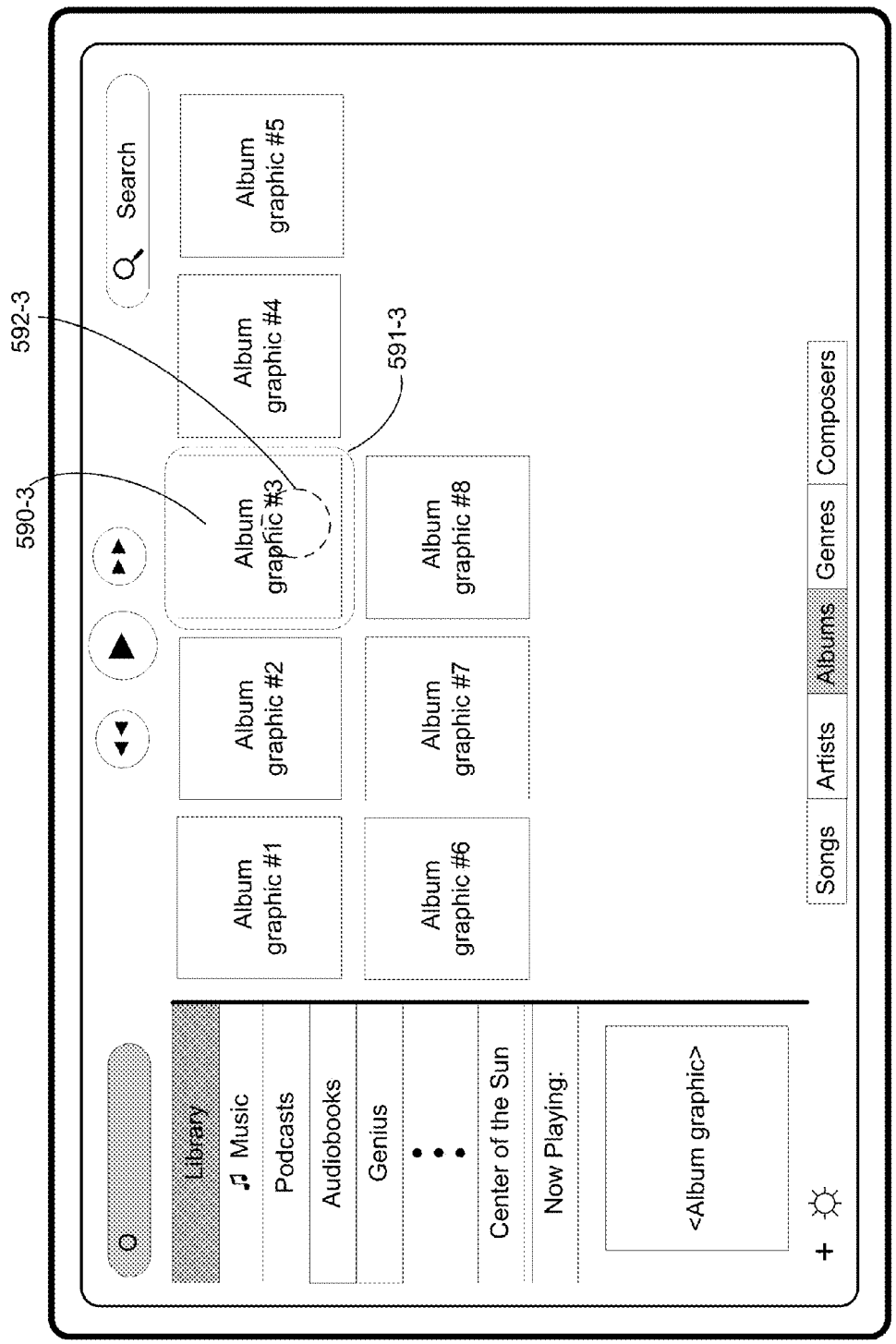
Figure 5L:
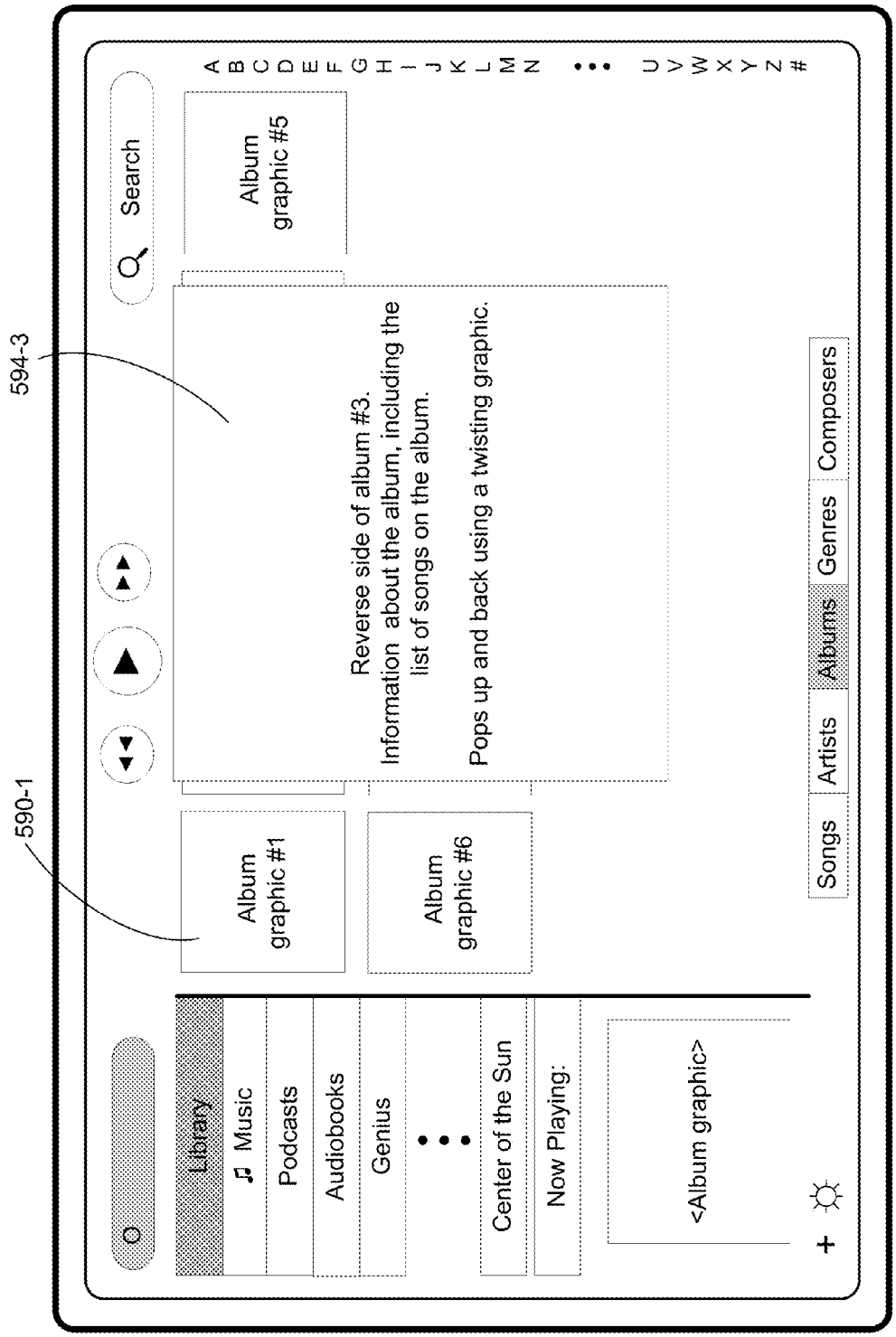
Figure 5M:
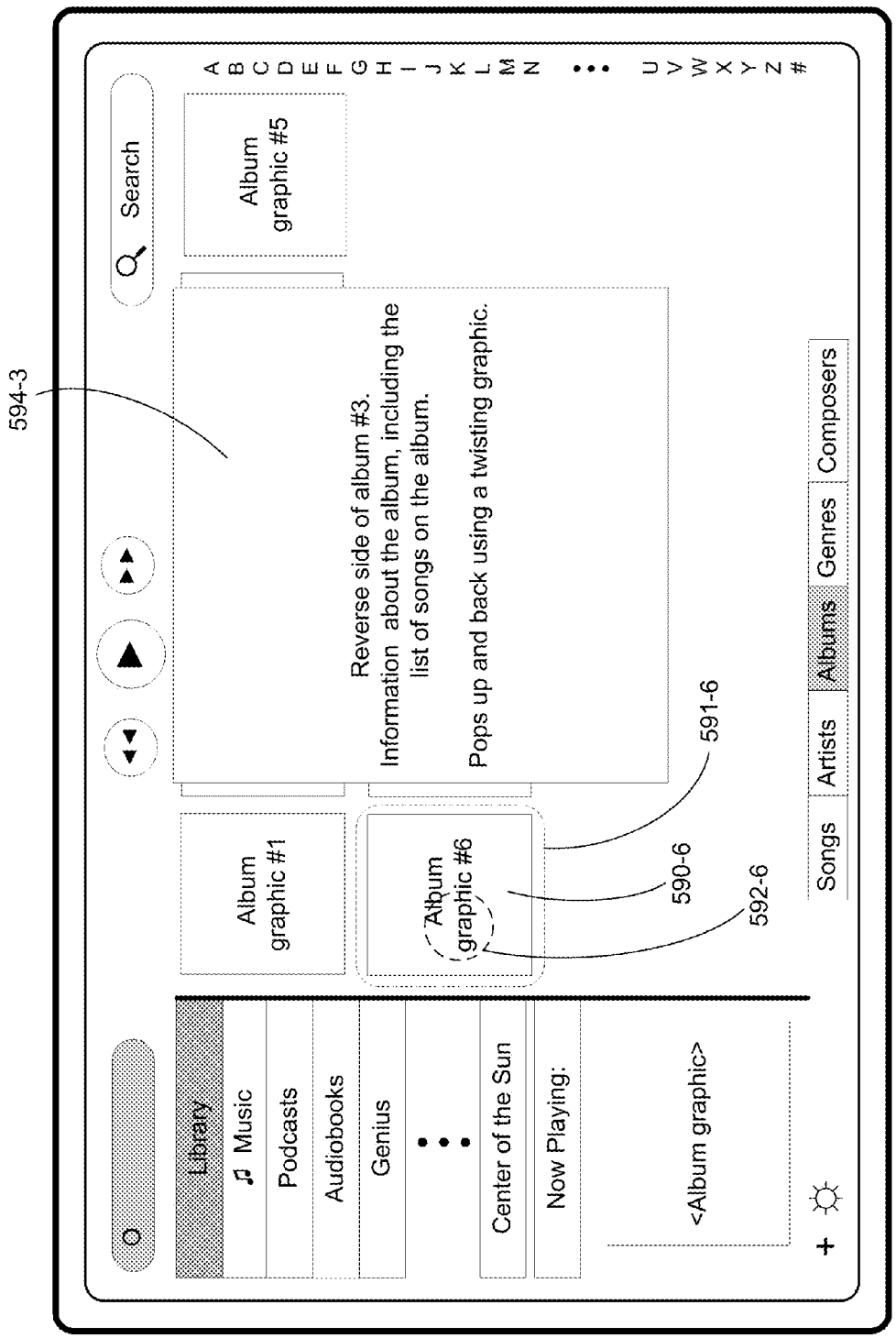
Figure 5N:
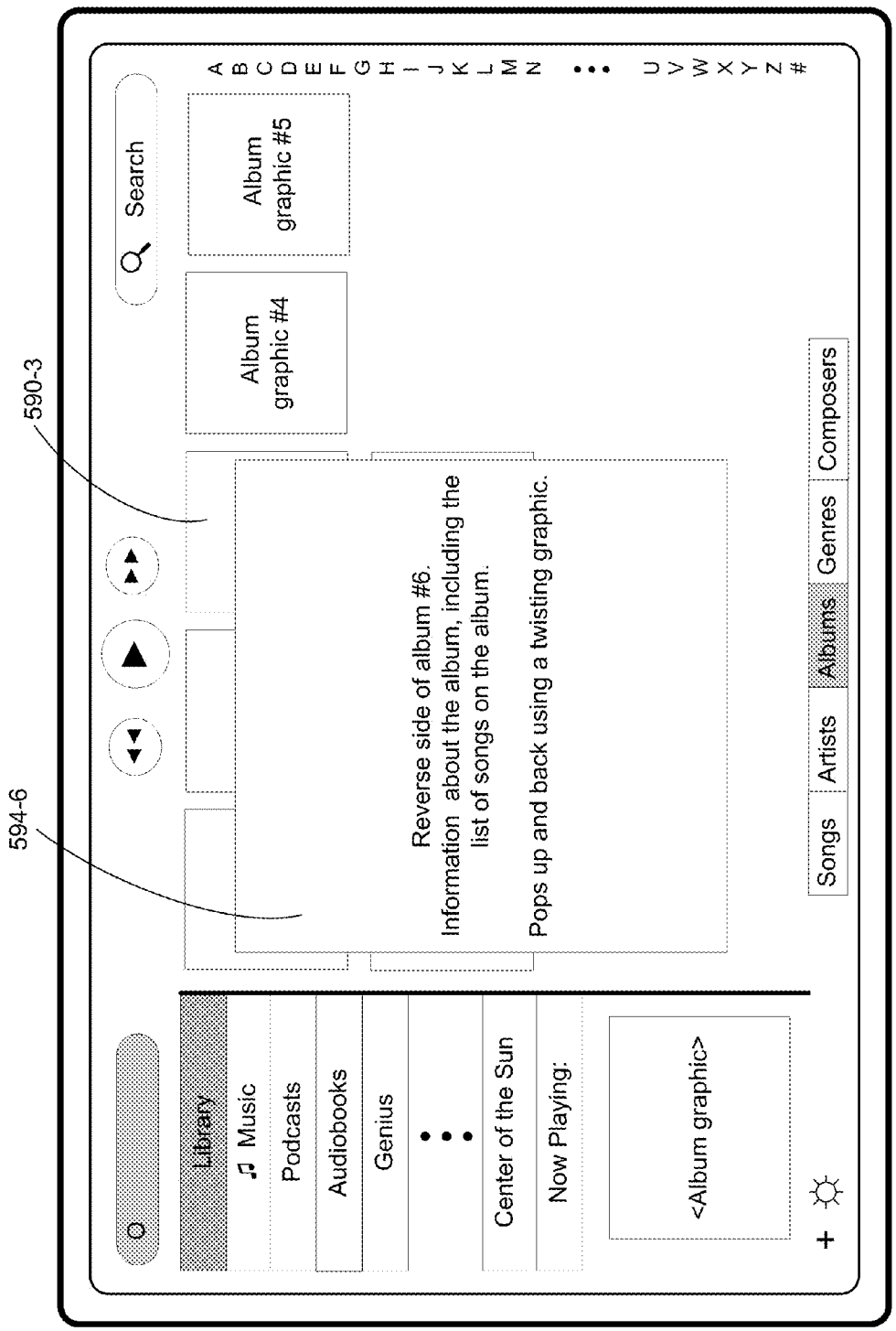
Figure 5O:
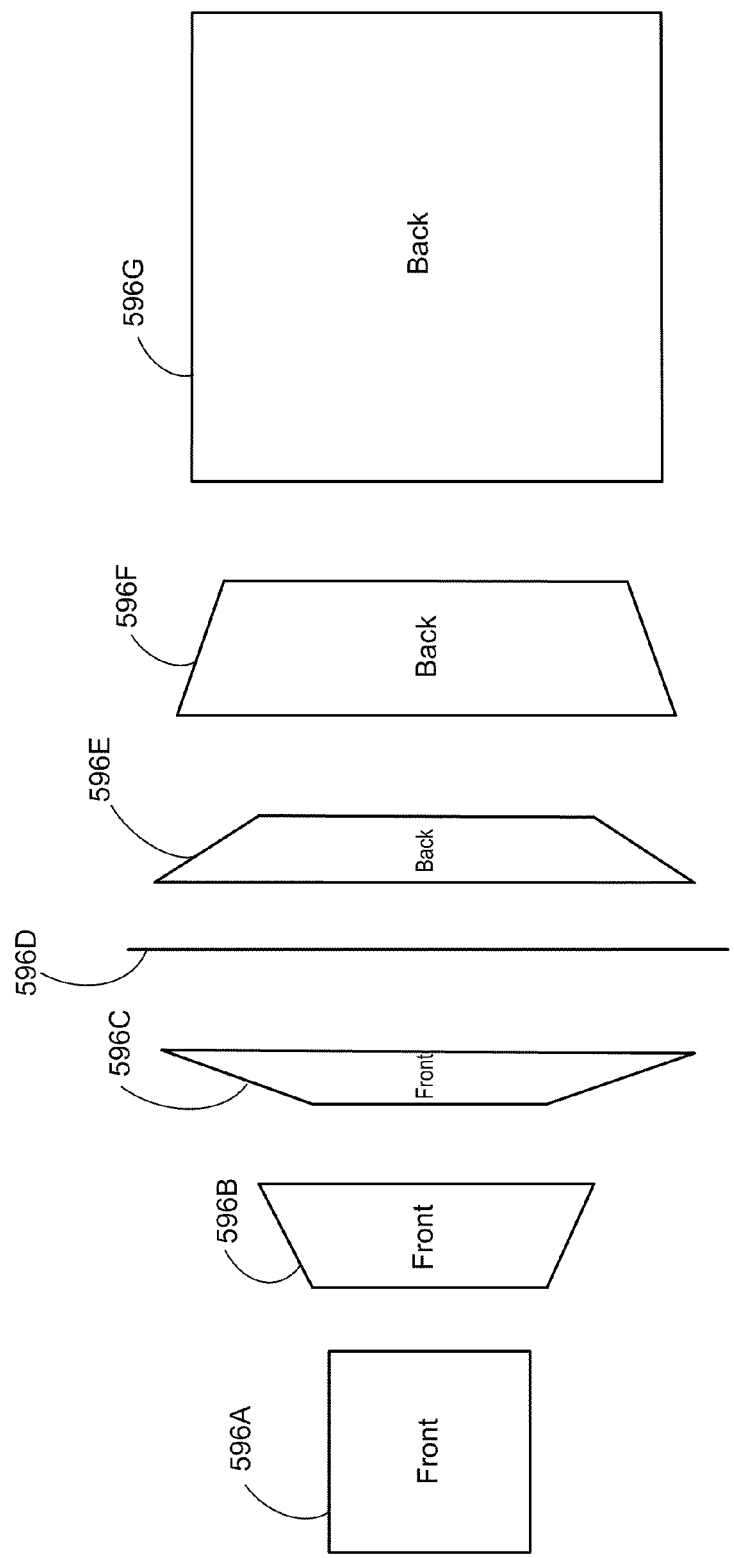
Figure 5P:
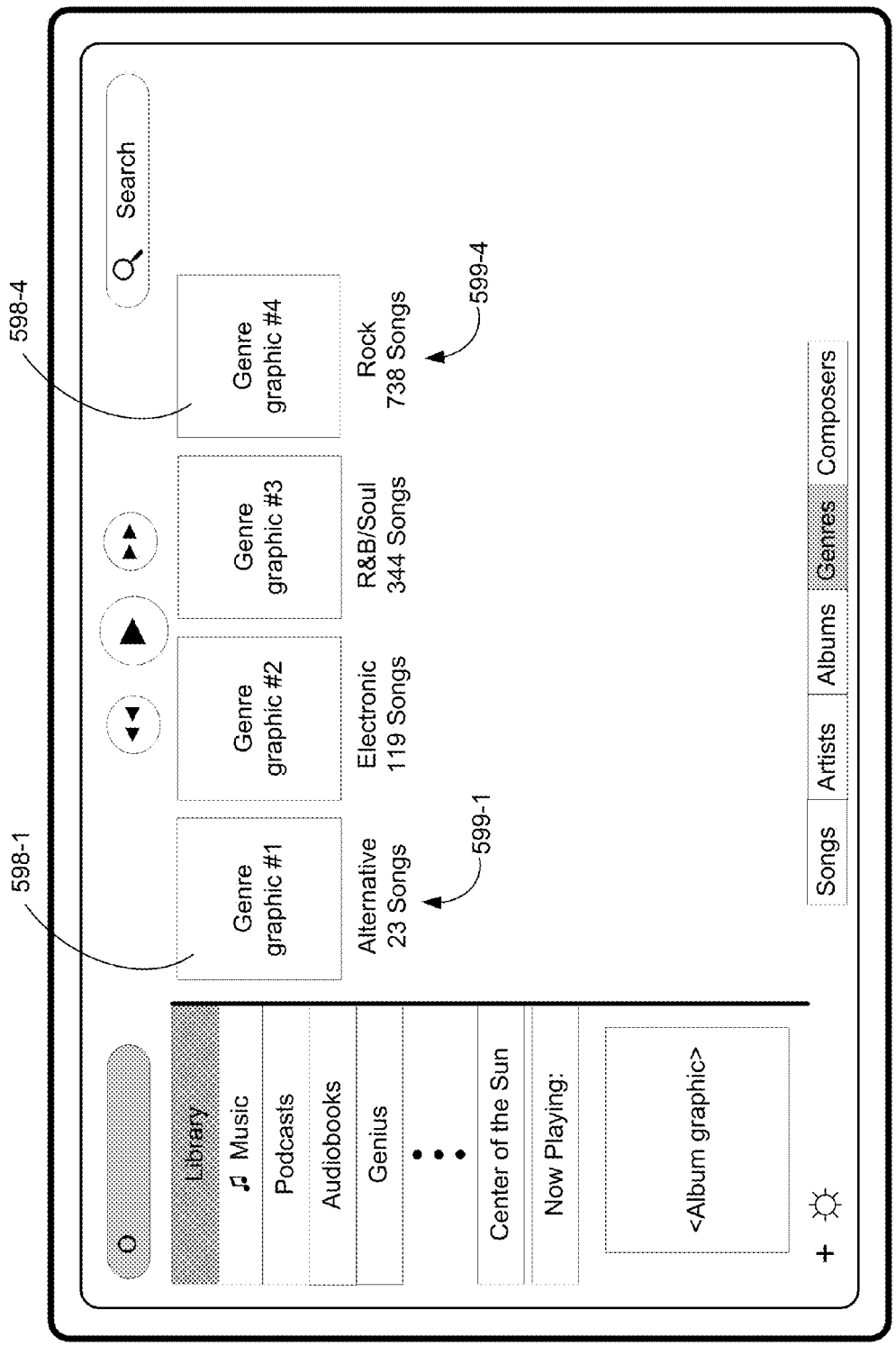
Figure 5Q:
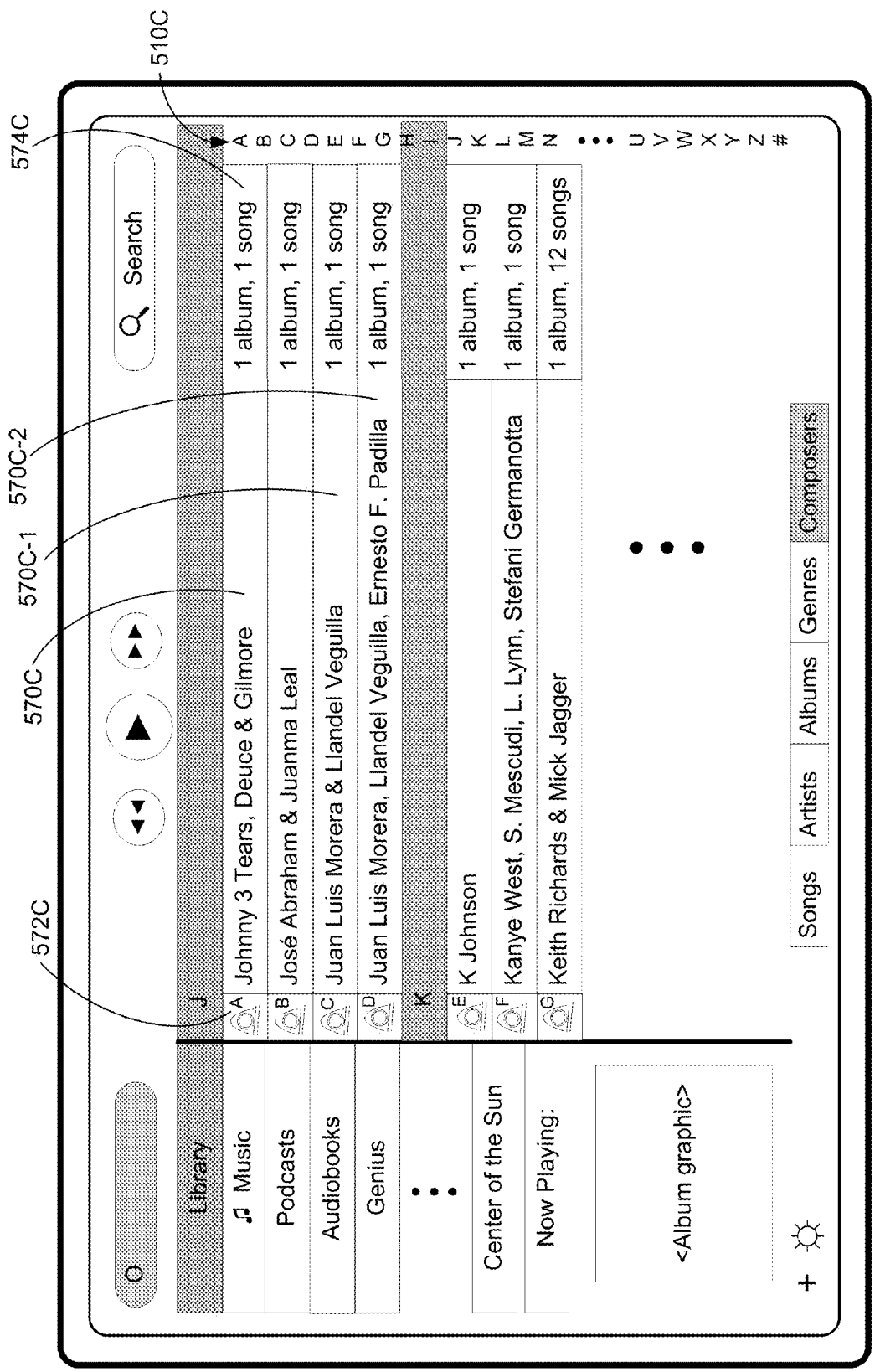
Figure 5R:
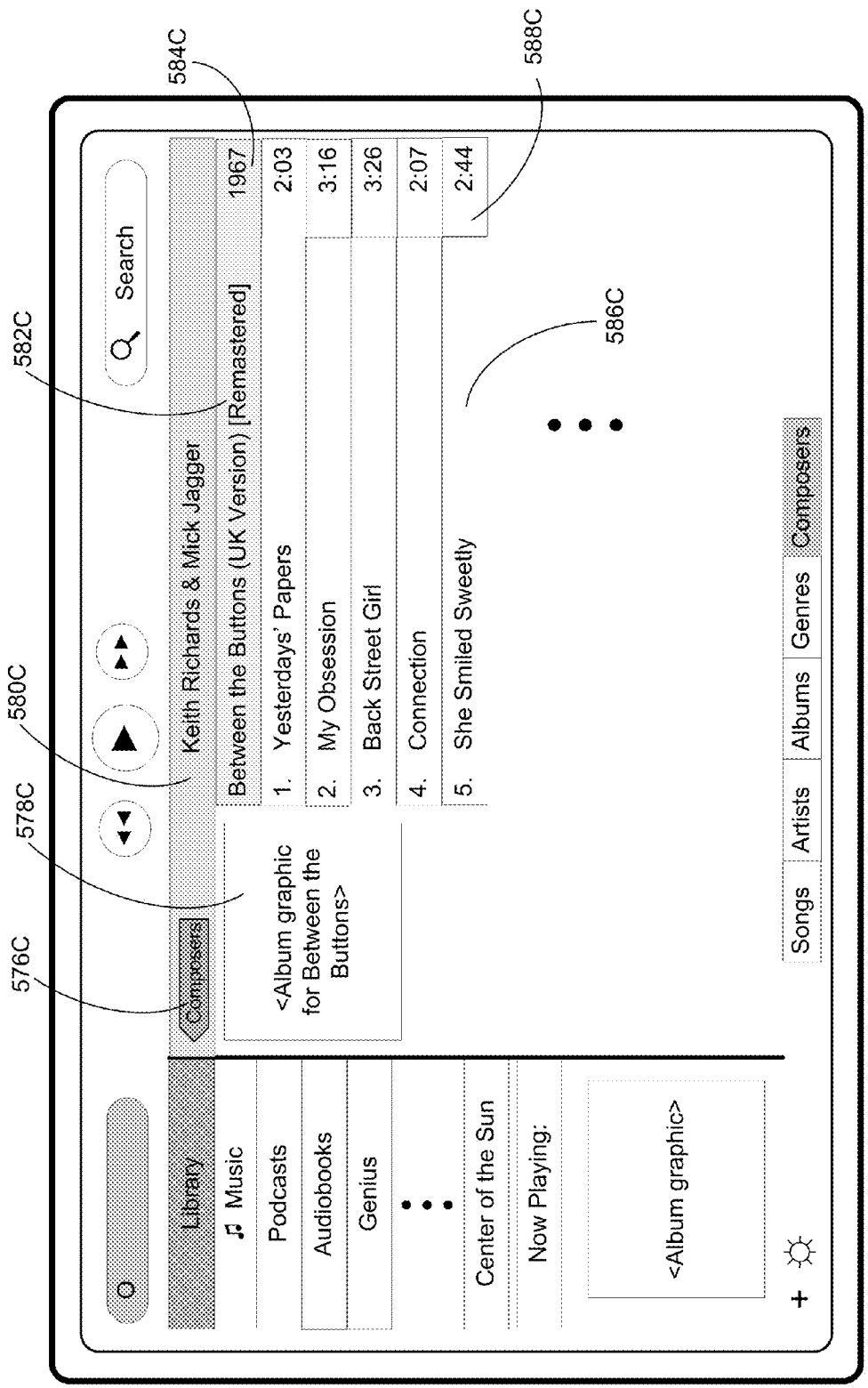

FIGS. 5A-5R illustrate exemplary user interfaces for providing digital media content to a user in accordance with some embodiments. The user interfaces in these figures are used to illustrate the processes described below, including the processes in FIGS. 6A-6B.

FIG. 5A illustrates an exemplary user interface for displaying media content. In some embodiments, a user may view or listen to selected digital media content. In the embodiment of FIG. 5A, the label "Now Playing" 514 identifies what digital content product has been selected for playing. When the content selected is music, an album graphic 516 appears to visually identify the content. When audio books, podcasts, videos, or other media are playing, other appropriate graphics are used, such as a book cover, or DVD cover. When a digital content product is selected, controls 502, 504, and 506 may be used to play the media or position the media at an appropriate point. When a user activates the Play button 504, the application begins playing the media (e.g., music). The reverse button 502 and fast forward button 506 may be used to reposition the media at a different location. In some embodiments there is a visual position control that indicates the current position within the song or other media, and the visual position control may be located under the controls 502, 504, and 506. In some embodiments a user may move a slider within the visual position control to change the current location within the selected media (e.g., position within the current song, podcast, or video). In some embodiments, the play button 504 becomes a "Stop" button when the media is playing.

The user interface illustrated in FIG. 5A includes media groups 512, which group together media content types, such as music, podcasts, audio books, video, and user created playlists. In the embodiment of FIG. 5A, the "Library" 512-1 is selected, as shown visually by the highlighting of the "library" label. The embodiment in FIG. 5A also includes a category selection bar 522, which provides alternative views of the digital content. In FIG. 5A, the currently selected category is "Songs," shown visually by the highlighting of the "Songs" box 522-1 in the catalog selection bar 522. The other illustrated categories will be described in more detail below. In some embodiments, the content items displayed are determined by the combination of the group and category selected. Search control 508 allows a user to perform a search of all available digital content. In some embodiments, the search is performed within the currently selected group and category; in other embodiments the search is conducted over all of the available content, regardless of the selected group or category.

In some embodiments, the formatting for the listing of digital content media depends on the selected group and/or category. In the embodiment of FIG. 5A, the digital content media are songs, corresponding to the selection of the "Songs" category 522-1 in category selection bar 522. In some embodiments, the songs are listed alphabetically by title. In some embodiments where the songs are listed alphabetically, there is a letter title bar at the beginning of each letter, such as title bar "A" 524 shown in FIG. 5A. In some embodiments, there is a quick selector bar 510S, which allows a user to jump to songs beginning with a selected letter. For example, selecting letter "M" (e.g., by contacting the touch sensitive surface in a location near the letter "M") would cause the display to jump to the beginning of the songs whose titles begin with the letter M.

In the embodiment shown in FIG. 5A, the listing displays song title 526, the song artist or music group 528, the corresponding album 530 in which the song appears, and the duration of the song 532. In some cases the same song title may be used in different albums, or by different artists or music groups, so the additional information may be necessary to uniquely identify a specific instance of a song.

The create playlist button 518 and create genius playlist button 520 provide two exemplary ways to create lists of songs. When a user selects the create genius playlist button 520, the user interface provides the user with a popup box to select one or more songs to form the basis for a genius playlist. The application creates a playlist with songs that are similar to the selected song or songs. The similarity selection may be based on historical data of what other users consider similar and/or other technical information about the songs, such as genre.

When a user selects the create playlist button 518, some embodiments provide a popup 534 prompting for the user for a name of the playlist, as illustrated in FIG. 5B. In exemplary embodiments, the popup 534 has a title bar 536 for entry of the playlist title, a cancel button 538 to cancel creation of the playlist, and a save button 540 to create a playlist with the entered name. In embodiments where the computing device has a physical keyboard, a user can key in the name of the playlist using the keyboard. In embodiments without a physical keyboard, a soft keyboard 542 appears, displaying the keyboard characters. In some embodiments, the soft keyboard 542 uses a standard QWERTY layout; in other embodiments, the soft keyboard 542 uses a limited QWERTY layout, which includes only those characters (e.g., letters, numbers, comma, period, dash and space) relevant to creating a playlist name. Optionally, soft keyboard 542 excludes function keys, cursor positioning keys, and punctuation and symbols not allowed in playlist names. In other embodiments, a simplified soft keyboard 542 may be used with alternative key layouts.

Once a playlist name has been created by the user, the user selects the songs to add to the playlist. In the exemplary embodiment shown in FIG. 5C, the available list of songs is displayed, with the instruction bar 544 identifying the playlist to create. In the embodiment of FIG. 5C, the user is adding songs to the "Test" playlist. In some embodiments, sources button 543 enables the user to limit the displayed songs to songs from one or more user-selected publisher (e.g., from a list of publishers). In some embodiments, songs may be selected by a user input anywhere within a row that contains the song. In some embodiments, the user input is a click of a pointing device. In other embodiments, the user input is a tap or other finger gesture on the touch-sensitive surface. In some embodiments, there are selection icons 548 which may be used to select a song for inclusion in a playlist. In some embodiments, a user may select a song for inclusion using either a selection icon 548 or other user input on a row identifying a song. In some embodiments, a song that has been selected is dimmed or otherwise identified so that the user knows it has been included in the playlist. In the embodiment shown in FIG. 5C, the song "Criminology" has been selected, so row 547 is dimmed. On the other hand, "Crazy Love" has not been selected, so row 546 does not appear dimmed. One of ordinary skill in the art would recognize that there are many alternative ways to identify which songs have been selected. In some embodiments, a specific song may be included multiple times in the same playlist by selecting the same song multiple times. When the user is done selecting songs, the user presses the "Done" button 545.

After user selection of the done button, some embodiments provide a display of the songs in the playlist as shown in FIG. 5D. The playlist title bar 550 identifies the playlist, and the listing shows both song titles 552 and song artist/group 554. In some embodiments, the corresponding album, duration of the song, or other identifying information is also provided in the list. In some embodiments, the listing shown in FIG. 5D also appears if a user selects a playlist from the media groups 512 (as shown in FIG. 5A). In some embodiments there is a means to begin editing a playlist, such as Edit button 556.

When a user chooses to edit a playlist (e.g., but pressing the Edit button 556 in FIG. 5D), the display changes, as shown by the exemplary embodiment in FIG. 5E. A user may choose to either add additional songs to the playlist or remove songs from the playlist. If the user selects the "Add Songs" button 558, the user is taken to the user interface form shown in 5C.

Alternatively, the user may choose to remove one or more songs, then press the Done button 560 to return to the playlist review form shown in FIG. 5D. In some embodiments song reordering icons 564 enable a user to reorder the listed songs by dragging a user-selected song to a new position within the displayed playlist. In some embodiments, a song is removed from a playlist by selecting a remove song icon 562 on a row corresponding to a song. In some embodiments, the remove song icon 562 is a "minus" symbol, either alone, or in combination with other symbols. In some embodiments, a user may remove a song from a playlist using a specific finger gesture or other user input on the touch-sensitive surface.

In some embodiments, pressing the remove song icon 562 immediately removes the song from the playlist. In other embodiments, pressing the remove song icon 562 prompts the user for confirmation as shown in FIG. 5F. In embodiments that require confirmation for removal of a song, a "Delete" (or similar) button 568 appears on the row containing the song, and the user must press that button to confirm removal of the song from the playlist. In some embodiments, the Delete button 568 replaces the song reordering icon 564 on the row requiring confirmation of deletion. In some embodiments, the remove song icon 562 is modified (e.g., rotating by 90 degrees), creating a modified remove song icon 566 after the remove song icon 562 has been pressed. In some embodiments, the modified remove song icon 566 can be pressed to cancel removal of the song, thus returning the graphical user interface to that shown in FIG. 5E.

FIG. 5G illustrates an exemplary user interface for viewing digital media content based on the song artists rather than song titles. In some embodiments, the artists are listed alphabetically, as illustrated in FIG. 5G. In some embodiments there is a quick selector bar 510A, which allows a user to jump to artists whose names begin with a selected letter. In an exemplary list view, the names of the artists 570A appear first, then include information about the albums by each artist. In some embodiments, there are visual album graphics 572A, which show the album covers of each of the albums by each artist. When the number of albums for an artist exceeds the space allocated in the display, the list of albums can be scrolled by the user by using touch gestures to scroll the list up and down. In some embodiments, the listing also includes a textual description 574A of the albums by each artist. In some embodiments, the textual description identifies the number of albums and number of songs by each artist, as illustrated in FIG. 5G.

When a user selects an artist from the graphical user interface shown in FIG. 5G (such as tapping or contacting the touch sensitive surface on a row corresponding to an artist), a subsequent user interface appears that shows the albums for the selected artist. An exemplary user interface to show the albums for an artist appears in FIG. 5H. In the embodiment shown in FIG. 5H, there is an "Artists" button 576A that returns the user to the graphical user interface of FIG. 5G with a list of artists. In some embodiments, there is an artist title bar 580A that identifies the name of the artist selected. The albums shown in this view all correspond to the selected artist. In some embodiments, for each album, there is an album graphic 578A, an album title bar 582A, and a year or date 584A associated with release of the album. The album graphic 578A in some embodiments corresponds to the cover of the album. The Song listing includes the name of each song 586A, and in some embodiments, includes the duration 588A for each song. When the list of songs cannot all fit onto the screen simultaneously, the list of songs is scrollable. In some embodiments, as the song list scrolls upward, the top album graphic 578A stays in the same position as the songs scroll, until the top album graphic 578A is "forced" to scroll to make space for the next album graphic. When scrolling downward, the process is reversed, with an album graphic beginning to appear as there is space for it.

FIGS. 5I-5O illustrate exemplary graphical user interfaces for displaying albums or other media content. As FIG. 5I illustrates, in some embodiments the albums are displayed in an array, which may be two dimensional. The album graphics, such as album graphic #1 590-1, album graphic #3 590-3, and album graphic #4 590-4 display the front side images of albums or other digital media products. In some embodiments, these front side images correspond to the images seen on the front covers of physical media corresponding to the same digital content. For example, the album cover of a physical CD may provide the front side image used for the album graphic shown in FIG. 5I. FIG. 5J presents album data similar to FIG. 5I, but displayed in a portrait mode. In some embodiments, the graphical user interface may switch dynamically from landscape mode (as shown in FIG. 5I) to portrait mode (as shown in FIG. 5J) dynamically. Because of the different dimensions, the portrait mode may show more media groups 512 than the landscape mode of FIG. 5I, but may show fewer albums.

FIG. 5K illustrates how an album may be selected. In some embodiments, front side image 590-3 is selected by tapping or contacting the touch-sensitive surface at a position 592-3 within the front side image 590-3. In some embodiments, additional "leeway" is given, so that a tap or touch on the touch-sensitive surface within expanded region 591-3 will select the graphical object corresponding to front side image 590-3. The shape of expanded region 591-3 may be any convenient shape, but would generally be substantially the same shape as the corresponding front side image (but larger than the front side image). In some embodiments using a pointing device, hovering a pointer over front side image 590-3 or expanded region 591-3 would constitute selection of the corresponding graphical object.

When the graphical object corresponding to an album is selected, the graphical user interface displays an animation. In the animation, the graphical object (e.g., album) is flipped over and visually brought closer to the user by expanding the size of the graphical object. In preferred embodiments the animation has continuous smooth motion, starting with a view of a front side image and ending with a enlarged view of the back side image. This process is described in more detail below with respect to FIG. 5O. For example, the animation begins with front side image 590-3 shown in FIG. 5K, and ends with back side image 594-3 shown in FIG. 5L. In some embodiments, the front side image 590-3 includes a graphical image representing a front cover of an album (or a video, audio book, podcast, etc.), and the back side image 594-3 includes information about the content of the digital content product (e.g., album), such as a scrollable list of songs or other pieces of content. In the view shown in FIG. 5L, one enlarged back side image 594-3 appears, and the remaining digital content products are represented by their front side images, such as front side image 590-1. In some embodiments, a tap or touch on the touch-sensitive surface in the region of the back side image (such as 594-3 in FIG. 5L) flips the digital object over, reversing the earlier animation, and returning the graphical object to the front side image 590-3 as shown in FIG. 5K. See the discussion regarding FIG. 5O for the reverse animation.

When a back side image (such as 594-3 in FIG. 5M) is displayed, and a user selects a front side image of another graphical object (such as front side image 590-6 in FIG. 5M), the graphical user interface simultaneously display two animations: in one animation, the graphical object corresponding to back side image 594-3 flips over and reduces in size back to the original front side image; and the front side image 590-6 flips over and enlarges. Each of these animations is described in more detail with respect to FIG. 5O below. As shown in FIG. 5M, selection of the second graphical object may be by tapping or touching 592-6 within a second front side graphical image 590-6, or by tapping or touching the touch-sensitive surface within an expanded region 591-6. In some embodiments that use a pointing device, hovering the pointer over the front side image 590-6 or over the expanded region 591-6 will select the corresponding graphical object.

At the end of the two simultaneous animations, the front side image of the first graphical object (e.g., 590-3) is returned to its original size and location, and the enlarged back side image 594-6 of the second graphical object is displayed. The information provided on back side image 594-6 is analogous to the information provided by the back side image 594-3 of the first graphical object (e.g., song titles). This is illustrated in FIG. 5N. In some cases, at the end of the two animations, the back side image of the second graphical object partially or fully covers the front side image of the first graphical object. As FIG. 5N shows, back side image 594-6 partially covers front side image 590-3. In some embodiments, rather than perform the two animations simultaneously, the two animations are performed sequentially, at least partially. For example, in some embodiments, the animation to flip and expand the second graphical object occurs after the first graphical object has returned to the original size and position showing its front side. In other embodiments, the animation to flip and expand the second graphical object occurs after the animation to return the first graphical object to its original size and position has already begun.

FIG. 5O is a schematic sequence depicting snapshots of various points in the animations identified above. Reading the snapshots from 596A to 596G illustrates the process of flipping over a graphical object to see the back side image. Reading the snapshots from 596G to 596A illustrates the process of flipping a graphical object back over and returning it to its original size. In preferred embodiments, each expansion animation begins at 596A, and ends at 596G through a continuous motion. Each contraction animation starts at 596G, and ends at 596A through a continuous motion.

An analogy to physical media facilitates understanding of this animation. If a person sees the front side of a music CD sitting on a table, and wishes to see what songs are on the CD, the user simultaneously brings the CD closer to her eyes and flips it over to see the back side of the CD. Just flipping over the CD would not be enough because the font size would generally be too small to read at a distance. Similarly, just bringing the CD closer would not be enough because the songs are listed on the back side. A person thus flips over the CD and brings it closer at the same time. The animation described herein provides a visual effect similar to the physical media just described.

As illustrated in FIG. 5O, the flipping and expanding begin by moving forward the right hand side of the front image. At the same time, the left hand side moves back, away from the user. However, because the motion also brings the overall image closer to the user, the left hand side does not appear to get smaller. Images 596B and 596C in FIG. 5O illustrate roughly a 45 degree turn and a 60 degree turn from the original position showing the front side. Image 596D shows the graphical object after 90 degrees of rotation, showing just the edge between the front side image and the back side image. Image 596E rotates the graphical object about another 20 degrees, so that the back side becomes partially visible.

The left hand side of image 596E stays roughly in the same place as the right hand side moves forward, resulting in Image 596F. Finally, completing the rotation results in back side image 596G. The graphical object undergoes a rotation of 180 degrees as the graphical object moves from image 596A to 596G. A rotation in the opposite direction plus movement away from the user takes the graphical object from image 596G back to image 596A.

FIG. 5P illustrates an exemplary graphical user interface that presents a genre view of the digital media products. In the embodiment shown in FIG. 5P there are 4 genres, including "Alternative," "Electronic," "R&B/Soul," and "Rock." In the embodiment shown, the "Alternative" genre is portrayed by genre graphic #1 598-1, and the "Rock" genre is portrayed by genre graphic #4 598-4. For each genre, there is a label and identifier of the number of songs within that genre (e.g., labels 599-1 and 599-4). In other embodiments, the labels specify the number of albums within the genre, or other information about the genre. A user may select a genre by tapping or touching the touch-sensitive surface within a genre graphic, such as 598-1 or 598-4. In some embodiments, there are expanded regions (analogous to region 591-3 in FIG. 5K) around each genre graphic where a tap or touch will select the genre. In some embodiments, selection of a genre brings up a list of songs, similar to the list shown in FIG. 5A. In other embodiments, selection of a genre brings up a list of albums, similar to the graphical user interface shown in FIG. 5I. In other embodiments, selection of a genre brings up a list of albums together with the songs on those albums, similar to the graphical user interface shown in FIG. 5H.

FIG. 5Q illustrates an exemplary view of digital content products based on composers. In some embodiments, the listed digital content is sorted alphabetically by the names of the composers. In the embodiment shown, there is a separate row for each distinct set of composer names 570C. A "set" of composers comprises one or more composers. For example, composer names Juan Luis Morera & Llandel Veguilla 570C-1 is not the same as the set of composer names Juan Luis Morera, Llandel Veguilla, and Ernesto F. Padilla 570C-2, so there are two separate rows. In some instances, a single album has songs composed by different sets of composers. In some embodiments, for each set of composers, one album graphic 572C is displayed, which may be a front side image of an album that contains a song composed by the set of composers. In some embodiments, the list includes an identification column 574C that specifies how many albums and/or songs have the set of composers. In some embodiments, there is a quick selector bar 510C that allows a user to jump directly to composers whose names begin with a certain letter by tapping or touching on the touch-sensitive surface on a letter within the quick selector bar 510C. In some embodiments, there are graphical user interfaces similar to the one shown in FIG. 5Q for composer views when the digital content products are podcasts, audio books, videos, etc. From the graphical user interface shown in FIG. 5Q, a user may select a set of composers by tapping or touching the touch-sensitive surface on a row corresponding to a set of composers.

In some embodiments, selection of a set of composers brings up an album list as illustrated in FIG. 5R, which is similar to the album list for artists illustrated in FIG. 5H. In some embodiments, the list displays all albums 578C that contain one or more songs composed by the set of composers identified in the composer title bar 580C. In some embodiments, each album includes a title bar 582C and the year 584C (or date) when the album was published. In some embodiments, the song list includes only songs composed by the identified set of composers. In other embodiments, all of the songs appearing on an album are listed, even if composed by a different set of composers. In some embodiments that show all of the songs on a album regardless of the set of composers, there is additional information for each song to specify the set of composers. In some of these embodiments, the songs composed by the selected set of composers are placed at the top of the list, or otherwise highlighted or emphasized to show that they match the selected set of composers. In some embodiments, the song list includes each song title 586C and duration 588C. In the embodiment shown in FIG. 5R, there is a "Composers" button 576C that returns the user to the graphical user interface of FIG. 5Q with a list of composers.

Figure 6A:
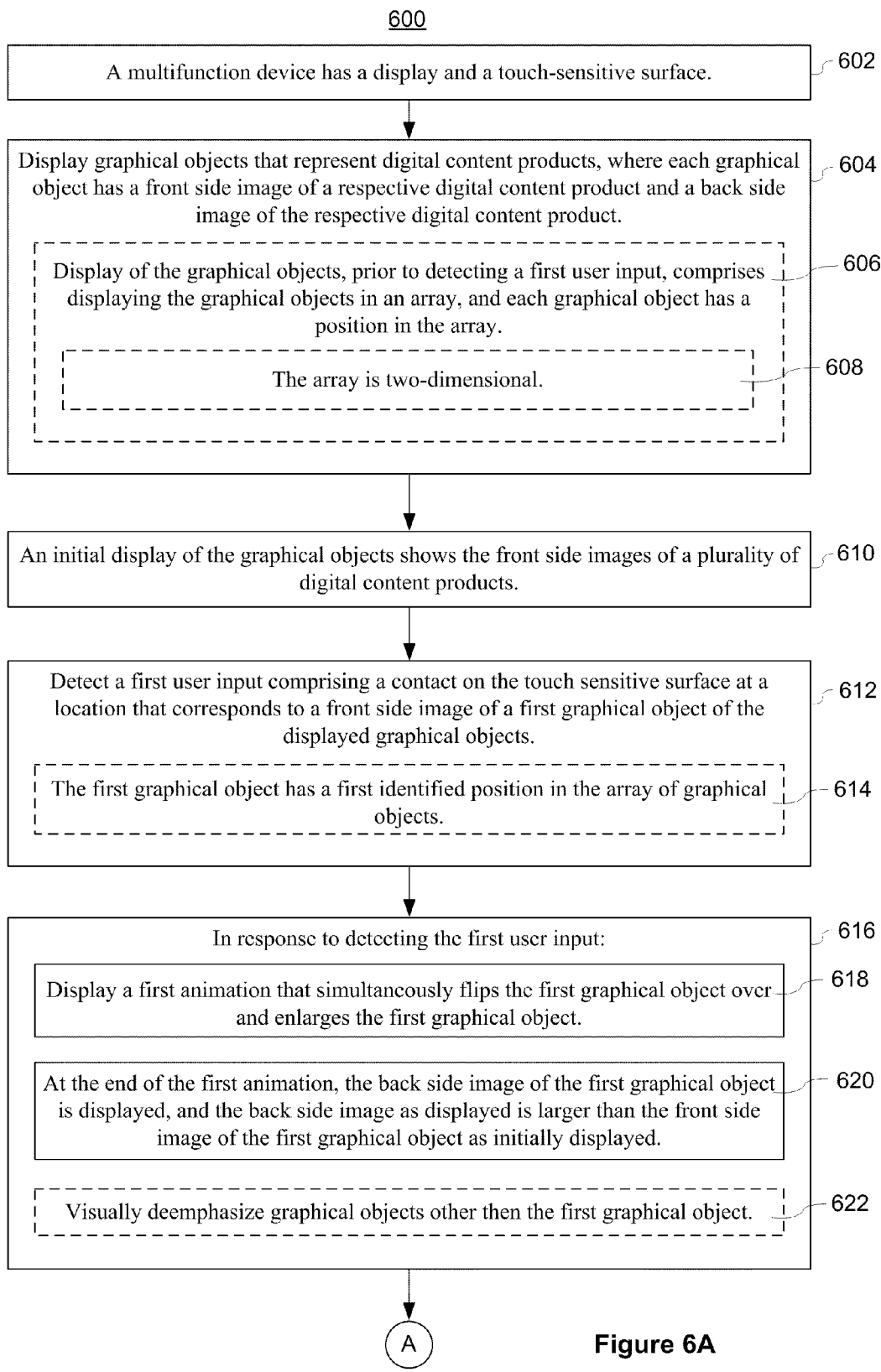
FIGS. 6A-6B are flow diagrams illustrating a method of animating the movement of graphical objects corresponding to digital content products in accordance with some embodiments.
Figure 6B:
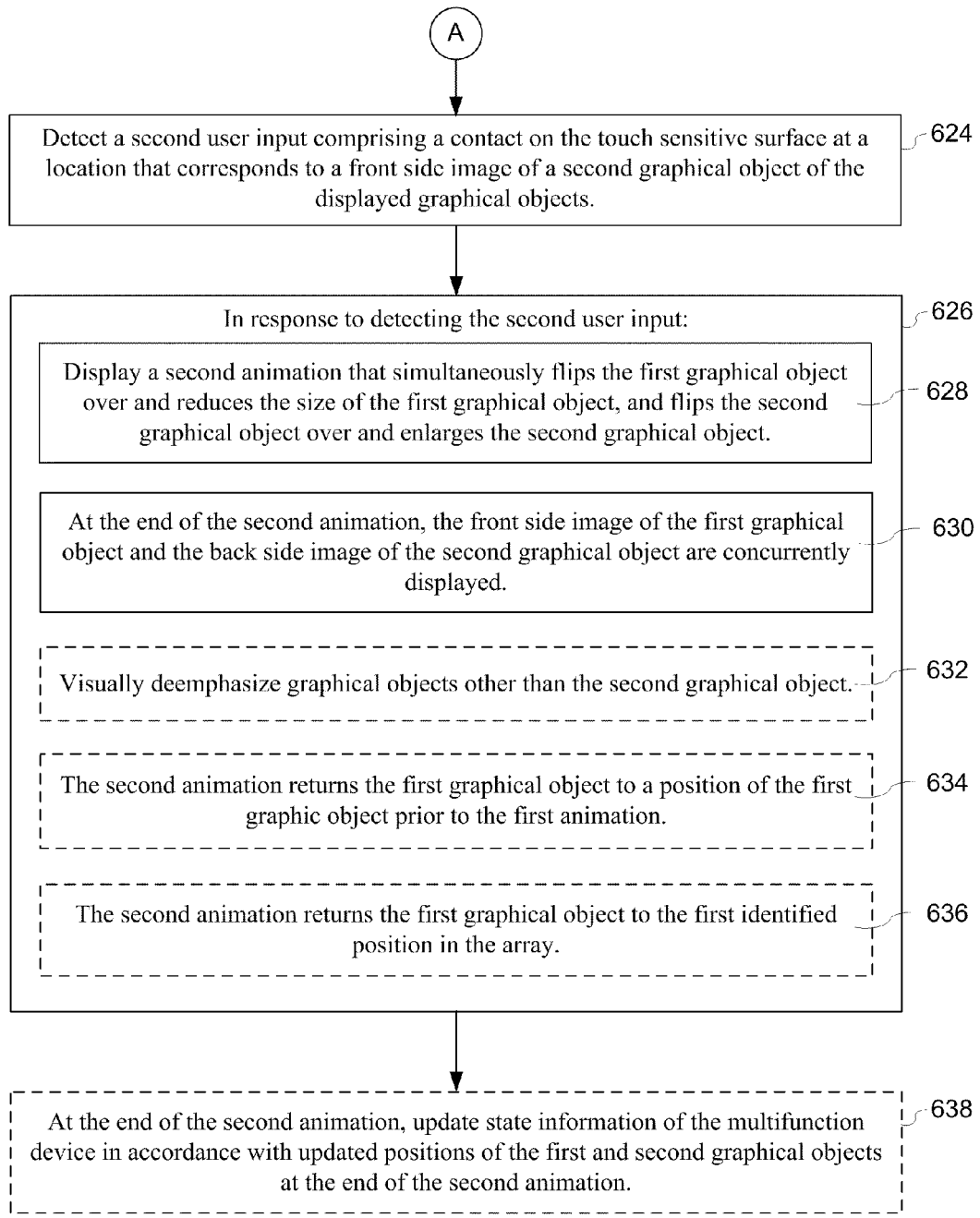

FIGS. 6A-6B are flow diagrams illustrating a method 600 of providing digital media content to a user in accordance with some embodiments. Method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, method 600 provides an intuitive way to display the digital media content of a digital content product. In some embodiments, the method identifies the songs associated with a particular album. The method reduces the cognitive burden on a user when the user seeks to identify the individual digital media content items associated with a digital content product, thereby creating a more efficient human-machine interface. For battery-operated computing devices, enabling a user to view the digital content faster and more efficiently conserves power and increases the time between battery charges.

Method 600 is performed (602) at a multifunction device that has a display and a touch sensitive surface. Graphical objects that represent digital content products are displayed (604). Each graphical object representing a digital content product has a front side image (such as front side album cover 590-1, 590-3, and 590-4 in FIGS. 5I and 5J, or other cover images) of a respective digital content product (such as a music album, audio book, podcast, or video) and a back side image of the respective digital content product (such as back side image 594-3 in FIG. 5L and back side image 594-6 in FIG. 5N). In some embodiments, the back side image includes a scrollable list of pieces of content in the digital content product (such as a list of songs) or other information about the digital content product. In some embodiments, display of the graphical objects, prior to detecting a first user input, comprises displaying the graphical objects in an array (606), and each graphical object has a position in the array (606). For example, FIGS. 5I-5K display an array of eight album graphics, and each album graphic, such as 590-4, has a position within the array. In some embodiments, such as those shown in FIGS. 5I-5K, the graphical objects are in a two-dimensional array (608). As illustrated in the embodiment of FIG. 5I, the individual rows and/or columns of the array need not be complete: this example shows a first row with five graphics, and a second row with only three graphics. As FIGS. 5I-5K illustrate, an initial display of the graphical objects shows (610) the front side images of a plurality of digital content products (e.g., front side images 590-1, 590-3, and 590-4).

The method detects (612) a first user input comprising a contact on the touch sensitive surface at a location that corresponds to a front side image of a first graphical object of the displayed graphical objects. As illustrated in FIG. 5K, there is a contact 592-3 on front side image 590-3. In some embodiments, there must be a contact directly on a front side image, such as front side image 590-3 in FIG. 5K. In some embodiments, the contact location may be on or near a front side image, such as the region 591-3 surrounding front side image 590-3. In some embodiments, the first user input comprises hovering a pointing device over a front side image or near a front side image. For example, in FIG. 5K, the first user input may include hovering a pointer over front side image 590-3 or over region 591-3. In some embodiments, first graphical object has a first identified position in the array of graphical objects (614). For example, the first graphical object 590-3 in FIG. 5K has a first identified position, which is the first row and third column.

Method 600 responds (616) to detecting the first user input. Method 600 displays a first animation that simultaneously flips (618) the first graphical object over and enlarges (618) the first graphical object. FIG. 5O illustrates an exemplary process of flipping and enlarging the first graphical object in the sequence of images 596A-596G. In exemplary embodiments, the flipping and enlarging are continuous smooth motions; FIGS. 596A-596G illustrate a small number of snapshots in the continuous motion. In other embodiments, the flipping and enlarging are performed in discrete steps. At the end of the animation, the back side image of the first graphical object is displayed, and the back side image as displayed is larger than the front side image of the first graphical object as initially displayed (620). For example, FIG. 5L illustrates back side image 594-3 after flipping and enlarging. The back side image 594-3 is larger than the front side image 590-3 that was initially displayed. The flipping and enlarging is also illustrated in the sequence 596A-596G in FIG. 5O. In some embodiments, method 600 visually deemphasizes (622) graphical objects other than the first graphical object. To visually deemphasize other graphical objects, method 600 may diminish other graphical objects that represent other digital content products (relative to the display of the back side image of the first graphical object) by dimming, shading, graying-out, or otherwise deemphasizing the other graphical objects.

The method detects (624) a second user input comprising a contact on the touch sensitive surface at a location that corresponds to a front side image of a second graphical object of the displayed graphical objects. As illustrated in FIG. 5M, there is a contact 592-6 on front side image 590-6. In some embodiments, there must be a contact directly on a front side image, such as front side image 590-6 in FIG. 5M. In some embodiments, the contact location may be on or near a front side image, such as the region 591-6 surrounding front side image 590-6. In some embodiments, the second user input comprises hovering a pointing device over a front side image or near a front side image. For example, in FIG. 5M, the first user input may include hovering a pointer over front side image 590-6 or over region 591-6.

Method 600 responds (626) to detecting the second user input. Method 600 displays (628) a second animation that simultaneously flips (628) the first graphical object over and reduces (628) the size of the first graphical object, and flips (628) the second graphical object over and enlarges (628) the second graphical object. FIG. 5O illustrates an exemplary process of flipping and enlarging the second graphical object in the sequence of images 596A-596G. FIG. 5O also illustrates an exemplary process of flipping and reducing in size the first graphical object by following the snapshots in the reverse order 596G-596A. At the end of the second animation, the front side image of the first graphical object and the back side image of the second graphical object are concurrently displayed (630). In some instances the enlarged back side image of the second graphical object may partially or fully cover the front side image of the first graphical object. For example, FIG. 5N illustrates back side image of the second graphical object 594-6 partially covering the front side image of the first graphical object 590-3.

In some embodiments, method 600 visually deemphasizes (632) graphical objects other than the second graphical object. To visually deemphasize other graphical objects, method 600 may diminish other graphical objects that represent other digital content products (relative to the display of the back side image of the second graphical object) by dimming, shading, graying-out, or otherwise deemphasizing the other graphical objects. As illustrated by front side image 590-3 in FIG. 5N, in some embodiments, the second animation returns the first graphical object to the original position of the first graphical prior to the first animation (634). In some embodiments, the second animation returns the first graphical object to the first identified position in the array (636). For example, FIG. 5N shows first graphical object returned to its original location in the first row and third column of the array.

At the end of the second animation, some embodiments update state information of the multifunction device in accordance with updated positions of the first and second graphical objects at the end of the second animation (638).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

For example, the operations depicted in FIGS. 6A and 6B may be implemented by components depicted in FIGS. 1A-1C. For example, user input detection operations 612, 624, and the resulting display update and content selection operations may be implemented by event sorter 170, event recognizer 180, and event handler 190. Event monitor 171 in event sorter 170 detects user inputs on a touch-sensitive display 112, and event dispatcher module 174 delivers the event information to application 136-1. In this case, application 136-1 includes methods and graphical user-interfaces for selecting and displaying graphical objects representing digital content products. A respective event recognizer 180 of application 136-1 compares the event information to respective event definitions 186, and determines whether the event information corresponds to predefined events and/or sub-events of gestures recognized by the application. When the predefined event or sub-event is detected, event recognizer 180 activates a corresponding event handler 180. Event handler 180 may utilize or call data updater 176 or object updater 177 to update data or a text display region and the application internal state 192. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
   a display;
   a touch-sensitive surface;
   one or more processors;
   memory; and
   one or more programs, wherein the one or more programs are stored in the memory and configured to be executed by the one or more processors, the one or more programs including instructions for:
   displaying graphical objects that represent digital content products, wherein each graphical object has a front side image of a respective digital content product and a back side image of the respective digital content product, and wherein an initial display of the graphical objects shows the front side images of a plurality of digital content products;
   detecting a first user input comprising a contact on the touch-sensitive surface at a location that corresponds to a front side image of a first graphical object of the displayed graphical objects;
   in response to detecting the first user input, displaying a first animation that simultaneously flips the first graphical object over and enlarges the first graphical object, wherein at the end of the first animation, the back side image of the first graphical object is displayed, and the back side image as displayed is larger than the front side image of the first graphical object as initially displayed;
   detecting a second user input comprising a contact on the touch-sensitive surface at a location that corresponds to a front side image of a second graphical object of the displayed graphical objects; and,
   in response to detecting the second user input:
       displaying a second animation that simultaneously
           flips the first graphical object over and reduces the size of the first graphical object, and
           flips the second graphical object over and enlarges the second graphical object, wherein at the end of the second animation, the front side image of the first graphical object and the back side image of the second graphical object are concurrently displayed.

2. The device of claim 1, including instructions for, in response to detecting the first user input, visually deemphasizing graphical objects other than the first graphical object.

3. The device of claim 1, including instruction for, in response to detecting the second user input, visually deemphasizing graphical objects other than the second graphical object.

4. The device of claim 1, including instructions for updating state information of the device in accordance with updated positions of the first and second graphical objects at the end of the second animation.

5. The device of claim 1, wherein the second animation returns the first graphical object to a position of the first graphical object prior to the first animation.

6. The device of claim 1, wherein displaying the graphical objects, prior to detecting the first user input, comprises displaying the graphical objects in an array, the first graphical object having a first identified position in the array, and the second animation returns the first graphical object to the first identified position in the array.

7. A method, comprising:
at a multifunction device with a display and a touch-sensitive surface:
   displaying graphical objects that represent digital content products, wherein each graphical object has a front side image of a respective digital content product and a back side image of the respective digital content product, and wherein an initial display of the graphical objects shows the front side images of a plurality of digital content products;
   detecting a first user input comprising a contact on the touch-sensitive surface at a location that corresponds to a front side image of a first graphical object of the displayed graphical objects;
   in response to detecting the first user input, displaying a first animation that simultaneously flips the first graphical object over and enlarges the first graphical object, wherein at the end of the first animation, the back side image of the first graphical object is displayed, and the back side image as displayed is larger than the front side image of the first graphical object as initially displayed;
   detecting a second user input comprising a contact on the touch-sensitive surface at a location that corresponds to a front side image of a second graphical object of the displayed graphical objects; and,
   in response to detecting the second user input:
       displaying a second animation that simultaneously
           flips the first graphical object over and reduces the size of the first graphical object, and
           flips the second graphical object over and enlarges the second graphical object, wherein at the end of the second animation, the front side image of the first graphical object and the back side image of the second graphical object are concurrently displayed.

8. The method of claim 7, including in response to detecting the first user input, visually deemphasizing graphical objects other than the first graphical object.

9. The method of claim 7, including in response to detecting the second user input, visually deemphasizing graphical objects other than the second graphical object.

10. The method of claim 7, including updating state information of the device in accordance with updated positions of the first and second graphical objects at the end of the second animation.

11. The method of claim 7, wherein the second animation returns the first graphical object to a position of the first graphical object prior to the first animation.

12. The method of claim 7, wherein displaying the graphical objects, prior to detecting the first user input, comprises displaying the graphical objects in an array, the first graphical object having a first identified position in the array, and the second animation returns the first graphical object to the first identified position in the array.

13. A non-transitory computer readable storage medium storing one or more programs, the one or more programs comprising instructions, which when executed by a multifunction device with a display and a touch-sensitive surface, cause the device to:
   display graphical objects that represent digital content products, wherein each graphical object has a front side image of a respective digital content product and a back side image of the respective digital content product, and wherein an initial display of the graphical objects shows the front side images of a plurality of digital content products;
   detect a first user input comprising a contact on the touch-sensitive surface at a location that corresponds to a front side image of a first graphical object of the displayed graphical objects;

in response to detecting the first user input, display a first animation that simultaneously flips the first graphical object over and enlarges the first graphical object, wherein at the end of the first animation, the back side image of the first graphical object is displayed, and the back side image as displayed is larger than the front side image of the first graphical object as initially displayed;

detect a second user input comprising a contact on the touch-sensitive surface at a location that corresponds to a front side image of a second graphical object of the displayed graphical objects; and, in response to detecting the second user input:

display a second animation that simultaneously flips the first graphical object over and reduces the size of the first graphical object, and flips the second graphical object over and enlarges the second graphical object, wherein at the end of the second animation, the front side image of the first graphical object and the back side image of the second graphical object are concurrently displayed.

14. The computer readable storage medium of claim 13, including instructions that cause the device, in response to detecting the first user input, to visually deemphasize graphical objects other than the first graphical object.

15. The computer readable storage medium of claim 13, including instructions that cause the device, in response to detecting the second user input, to visually deemphasize graphical objects other than the second graphical object.

16. The computer readable storage medium of claim 13, including instructions that cause the device to update state information of the device in accordance with updated positions of the first and second graphical objects at the end of the second animation.

17. The computer readable storage medium of claim 13, wherein the second animation returns the first graphical object to a position of the first graphical object prior to the first animation.

18. The computer readable storage medium of claim 13, wherein displaying the graphical objects, prior to detecting the first user input, comprises displaying the graphical objects in an array, the first graphical object having a first identified position in the array, and the second animation returns the first graphical object to the first identified position in the array.

* * * * *